(12) United States Patent
Takimoto et al.

(10) Patent No.: US 7,150,566 B2
(45) Date of Patent: Dec. 19, 2006

(54) OPTICAL DEVICE

(75) Inventors: Toshihiro Takimoto, Kitami (JP);
Yasushi Sato, Kitami (JP); Hiroshi Hashimoto, Kitami (JP); Sadaaki Minamimoto, Kitami (JP); Hideto Sonoda, Kitami (JP); Mikio Kyomasu, Kitami (JP); Akira Kashiwazaki, Kitami (JP)

(73) Assignee: Kyocera Corporation, Kyoto (JP)

( * ) Notice: Subject to any disclaimer, the term of this patent is extended or adjusted under 35 U.S.C. 154(b) by 35 days.

(21) Appl. No.: 11/020,497

(22) Filed: Dec. 21, 2004

(65) Prior Publication Data

US 2005/0169584 A1  Aug. 4, 2005

(30) Foreign Application Priority Data

Dec. 22, 2003  (JP)  ............ P 2003-425762
Jan. 28, 2004  (JP)  ............ P 2004-019875

(51) Int. Cl.
*G02B 6/38* (2006.01)

(52) U.S. Cl. ............ 385/72; 385/70; 385/73; 385/75; 385/11; 385/77; 385/78

(58) Field of Classification Search ............ 385/53, 385/55, 60, 66, 70, 72, 73, 75, 77, 78, 139, 385/11, 124, 123, 14
See application file for complete search history.

(56) References Cited

U.S. PATENT DOCUMENTS 6,485,191 B1 * 11/2002 Sato ............ 385/73

FOREIGN PATENT DOCUMENTS

| EP | 1612588 A2 * | 1/2006 | |
|----|----|----|----|
| JP | 05-060934 | 3/1993 | ............ 385/123 X |
| JP | 07-084143 | 3/1995 | ............ 385/123 X |
| JP | 2001-311851 | 11/2001 | ............ 385/123 X |
| JP | 2002258116 A * | 9/2002 | |
| JP | 2003-161838 | 6/2003 | ............ 385/123 X |

* cited by examiner

*Primary Examiner*—Brian M. Healy
(74) *Attorney, Agent, or Firm*—Hogan & Hartson LLP

(57) ABSTRACT

An optical device having: an optical fiber body; a ferrule which surrounds the above described optical fiber body and to which a recess that crosses a coreless fiber within the above described optical fiber has been provided; and an optical element which is provided within the recess in said ferrule, is provided with a protective member for protecting the above described recess, and the protective member has a restriction means for physically restricting the rotation of the optical device around the optical axis.

18 Claims, 21 Drawing Sheets

OPTICAL DEVICE

BACKGROUND OF THE INVENTION

1. Field of the Invention

The present invention relates to an optical device provided with a pedestal for mounting an optical element such as an optical isolator, and in particular, to an optical device which is appropriate for optical communication.

2. Description of the Background Art

In recent years, transmission of optical signals and optical energy using optical fibers has been carried out actively, in fields such as optical communication and optical measurement, along with the development of optical technology. In such systems, it is necessary to optically couple light sources, photo receivers, wave filters and optical elements for sensing to optical fibers, and in addition, miniaturization of coupling parts is required.

An optical connector type part for a connection to an optical connector where a filter is installed in a ferrule has been proposed in, for example, Japanese Unexamined Patent Publication No. H5 (1993)-60934. Concretely speaking, a slit which crosses the through hole for the fiber of a ferrule is created, and an optical element, such as an optical filter, is placed within this slit. This structure, however, becomes complicated, because a number of coupling members are used in addition to the body of the ferrule, increasing the entire length. In addition, the creation of the slit causes a great insertion loss. In a single mode fiber, though the loss is comparatively small in the case where the slit width is approximately 200 μm or smaller, the loss of the slit portion exceeds 10 dB in the case where the slit width exceeds 400 μm, making it impossible to use as a conventional device. Accordingly, such an optical connector type part cannot be utilized for a large optical element of which the thickness exceeds 700 μm, like an optical isolator.

In addition, a method for simply connecting an optical isolator to a connector has been proposed in Japanese Unexamined Patent Publication No. H7 (1995)-84143. A polarization independent type optical isolator is used in a manner where the optical isolator is sandwiched by beam conversion elements from both ends for optical coupling, and these are fixed within a slotted sleeve. In this example, the problem of insertion loss has been solved by using beam conversion elements. Here, a core expansion fiber which is difficult to manufacture as beam conversion elements has been assumed. In addition, a birefringent single crystal is used for the polarization independent type isolator, leading to a problem where the system becomes complicated, in comparison with a polarization dependent type isolator.

Japanese Unexamined Patent Publication No. 2001-311851 shows a structure where a recess is created in a ferrule, to which an optical fiber body formed of a single mode fiber, a graded index fiber and a coreless fiber is fixed, and a polarization dependent type optical isolator is installed in this recess. In addition, Japanese Unexamined Patent Publication No. 2003-161838 discloses an installment of an annular protective member around this recess. These structures allow an appropriate optical coupling (optical connection) to an optical fiber to be implemented by means of compact configuration of parts.

SUMMARY OF INVENTION

In the case where a polarization dependent type optical element, such as an optical isolator, is coupled to an optical fiber as described in Japanese Unexamined Patent Publication 2001-311851, however, it is necessary to adjust the polarization axis of the optical isolator so that the direction thereof becomes the same as the direction of polarization of incident light. Therefore, conventionally, a large-scale device is required for coupling an optical fiber to an optical isolator. A mounting unit having a rotation adjusting mechanism around the optical axis, for example, is used so as to carry out a rotational adjustment through image recognition or the like, on the basis of a mark that has been separately created. Alternatively, a mounting unit having a rotation adjusting mechanism around the optical axis is used so as to carry out a rotational adjustment while measuring light outputted by an optical device.

Thus, according to an aspect of the present invention, an optical device is provided with: an optical fiber body; a ferrule which surrounds the above described optical fiber body and where a recess is provided so as to cross a coreless fiber within the above described optical fiber; and an optical element placed within the recess of the above described ferrule, characterized by being provided with a protective member for protecting the above described recess, where this protective member has a restricting means for physically restricting rotation of the optical device around an optical axis.

In such an optical device, an angle around the optical axis can be extremely easily determined by a mechanical means, such as engagement, without using a large-scale rotation adjusting unit, even in the case where the optical element has polarization dependent properties, like an optical isolator. In addition, it is preferable for the optical fiber body to include a single mode fiber, a graded index fiber of which the index of refraction gradually decreases from the central axis toward the outer periphery, and a coreless fiber having no core, and thereby, the optical element can easily be coupled with low loss to another ferrule or a device having a ferrule.

This restricting means can be a plane portion, a protrusion portion, a trench portion or the like provided in the protective member. In addition, it is preferable to adjust with this restricting means the angle between the polarization axis of the optical isolator and the polarization axis of incident light within 10 degrees.

In addition, it is preferable to create a recess by integrally processing the above described protective member and ferrule. This is for the following reasons. A thin portion is formed in a ferrule when a recess is created therein. Therefore, a ferrule is easily broken in the case where a protection member is attached to the ferrule after the creation of a recess. In the case where a protective member and a ferrule are processed integrally, the ferrule can be prevented from being broken at the time of the attachment of the protective member, and also, the manufacturing process can be simplified to a great degree.

In addition, the ferrule where the above described optical fiber body is placed may be provided with a sleeve for joining another ferrule from the outside.

In addition, according to another aspect of the present invention, an optical device is provided with: an optical fiber body; a ferrule which surrounds the above described optical fiber body and where a recess is provided so as to cross a coreless fiber within the above described optical fiber; and an optical element placed within the recess of the above described ferrule, characterized by being provided with a sleeve which protects the above described recess and which is connectable to another ferrule, where this sleeve has a restricting means for physically restricting rotation of the optical device around an optical axis.

This restricting means can be a plane portion, a protrusion portion, a trench portion or the like provided in the protective member. In addition, it is preferable to adjust with this restricting means the angle between the polarization axis of the optical isolator and the polarization axis of incident light within 10 degrees. Furthermore, it is preferable to create a recess by integrally processing the above described sleeve and ferrule. In addition, it is preferable for the optical fiber body to include a single mode fiber, a graded index fiber of which the index of refraction gradually decreases from the central axis toward the outer periphery, and a coreless fiber having no core, and thereby, the optical element can easily be coupled with low loss to another ferrule or a device having a ferrule.

In addition, according to either of the above described aspects, it is preferable for the recess created in the ferrule to be a counterbored hole of which the bottom surface is flat and the corner where the bottom surface and the side intersect has a curvature radius of 0.2 mm or less. As a result of this, reduction in the strength of the ferrule due to the creation of the recess can be avoided, and deviation of the light path due to the optical element riding on the corner and inclining, which has a rounded form, can be prevented.

In addition, it is preferable for the material of the member for reinforcement or the sleeve which is attached to the ferrule to be the same material as that of the ferrule. As a result of this, stress which is applied to the ferrule due to the difference in the coefficient of thermal expansion can be reduced at the time when a thermal load is placed on the optical device, and the ferrule can be prevented from being broken.

DESCRIPTION OF THE PREFERRED EMBODIMENTS

Embodiment 1

Figure 1A:
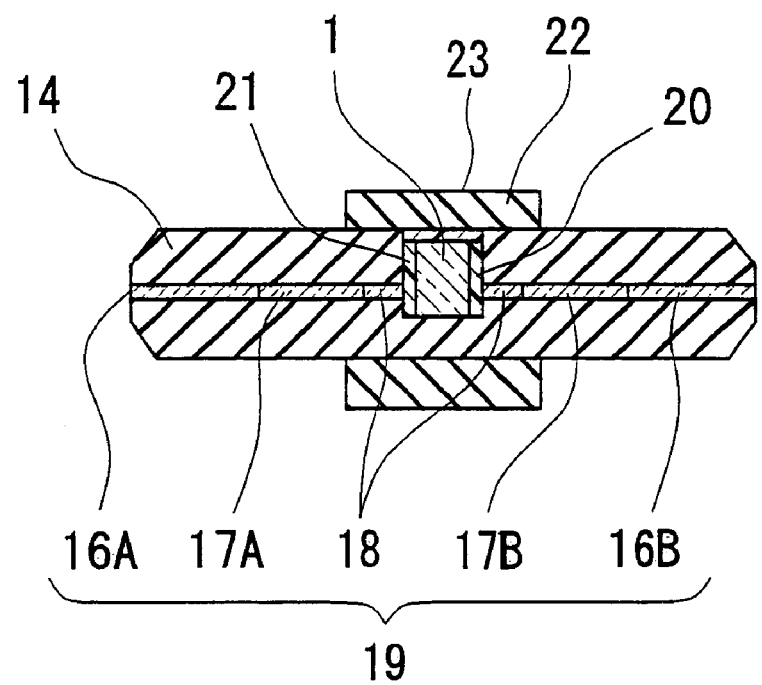
FIGS. 1A and 1B are a cross-sectional diagram and a side diagram showing the optical device according to Embodiment 1 of the present invention.

FIG. 1A is a cross-sectional diagram showing an optical device M1 according to Embodiment 1 of the present invention.

As shown in FIG. 1A, an optical fiber body 19 is inserted into a ferrule 14, and an optical isolator 1, which is an optical element, is placed within a recess 20 that has been created in the ferrule 14. The surrounding space of the optical isolator 1 is filled in with an adhesive 21. In addition, an annular reinforcing member (protective member) 22 is attached so as to surround the recess 20 in the ferrule 14.

The optical isolator 1 has a function of transmitting light in the forward direction, and of blocking light in the backward direction. In a semiconductor laser (hereinafter abbreviated to LD) utilized for optical communication or optical measurement, the internal state of interference is nullified, causing problems such as a difference in the wavelength and fluctuation of the output when reflected light returns from the outside so as to enter the active layer of the LD. In order to stably oscillate an LD, an optical isolator for blocking light in the backward direction is utilized. An optical isolator is indispensable in communication that requires strict control of the wavelength, for measuring with high precision, communicating using high speed modulation, and increasing the density.

Figure 2A:
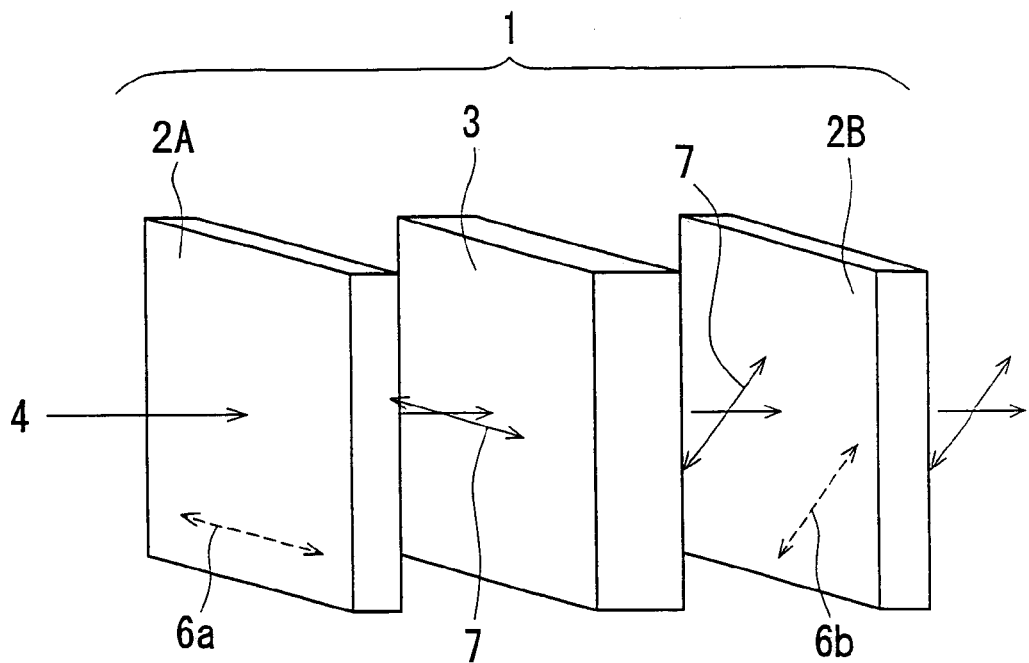
FIGS. 2A and 2B are schematic diagrams showing the principles of operation of an optical isolator.
Figure 2B:
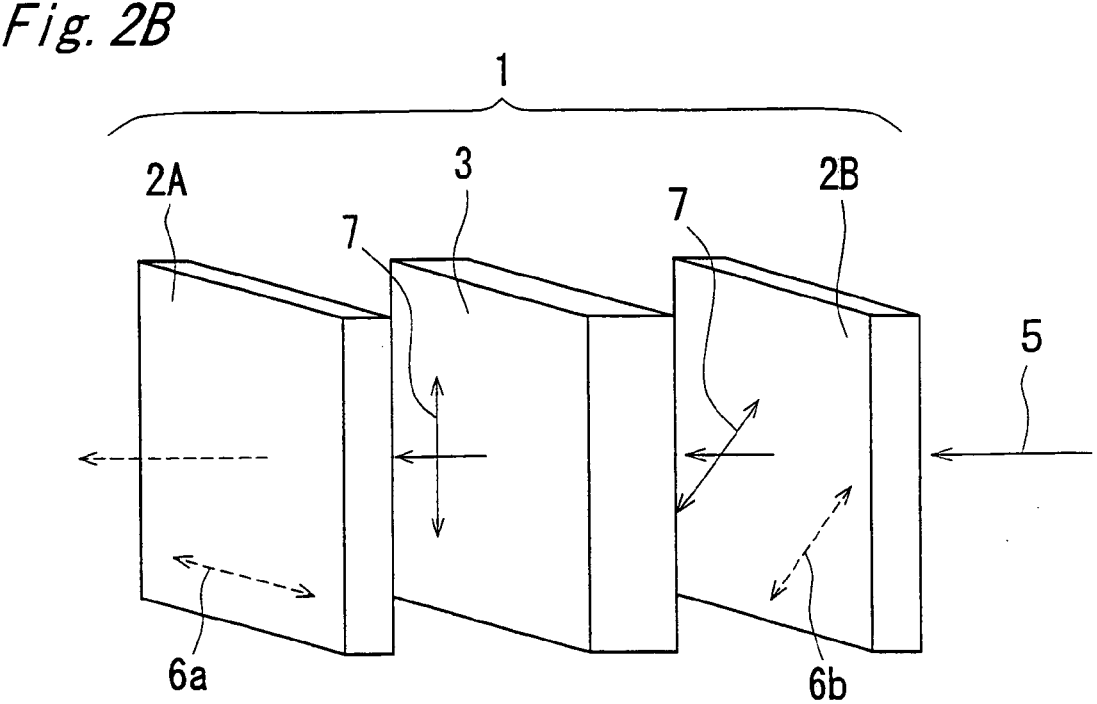

FIGS. 2A and 2B show schematic diagrams of the optical isolator 1. The optical isolator 1 is formed of a Faraday rotator 3 placed between a first polarizer 2A and a second polarizer 2B, and a magnet (not shown) for applying a magnetic field to this Faraday rotator 3. Here, the directions of polarization of light that transmits the polarizer 2A and 2B are referred to as polarization axes 6A and 6B.

When an optical isolator transmits light in the forward direction, as shown in FIG. 2A, light 4 in the forward direction that has transmitted through the first polarizer 2A is formed solely of a linear polarization component 7 in the same direction as that of the polarization axis 6a. The direction of polarization of his linear polarization component 7 is rotated 45° by means of the Faraday rotator 3 so as to agree with the polarization axis 6B of the second polarizer 2B. Accordingly, the light transmits without being attenuated by the second polarizer 2B.

On the other hand, when the optical isolator transmits light in the backward direction, as shown in FIG. 2B, light 5 in the backward direction initially enters the second polarizer 2B where only the linear polarization component 7 which is polarized in the same direction as that of the polarization axis 6b transmits. The direction of polarization of this light is rotated 45° by means of the Faraday rotator 3. The direction of the polarization of the rotated linear polarization component 7 becomes perpendicular to the polarization axis 6a of the first polarizer 2A. Accordingly, the light 5 that has entered from the backward direction is blocked by the optical isolator 1.

Figure 8:
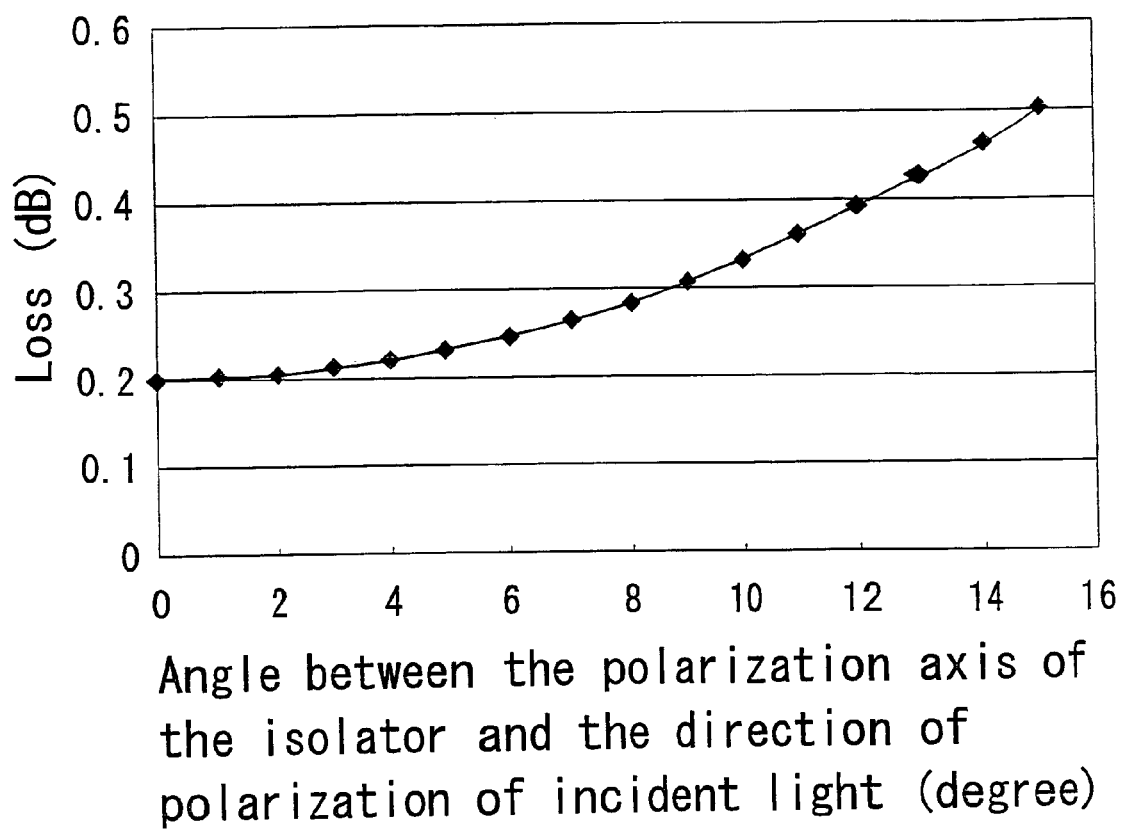
FIG. 8 is a graph showing the relationship between the angle between the polarization axis of the isolator and the direction of polarization of incident light, and the insertion loss of the isolator.

The optical isolator 1, as described above, only transmits light polarized in a particular direction, and therefore, is referred to as a polarization dependent type optical isolator. Light outputted from an LD is linearly polarized, and therefore, a polarization dependent type optical isolator is exclusively used in a module where an LD is mounted. It is important in such a polarization dependent type optical isolator to make the direction of polarization of incident light agree with the direction of the polarization axis of the optical isolator. FIG. 8 is a graph showing the relationship between the angle between the polarization axis of the optical isolator 1 and the direction of polarization of incident light, and the insertion loss of the optical isolator 1. An optical isolator with an insertion loss of 0.2 dB is used. As shown in FIG. 8, when the angle between the polarization axis of the optical isolator 1 and the direction of polarization of incident light becomes 9 degrees to 10 degrees, the insertion loss exceeds 0.3 dB. Accordingly, it is desirable for the angle between the polarizing axis of the optical isolator 1 and the direction of polarization of incident light to be controlled so as to be 10 degrees or less, in order to suppress the excessive loss to 0.1 dB or less.

Figure 1B:
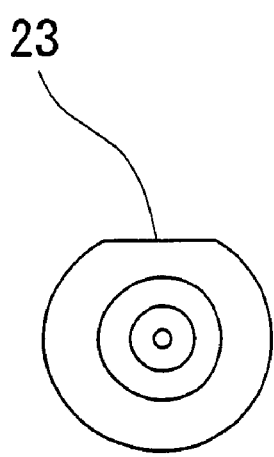

Thus, in the present embodiment, as shown in FIGS. 1A and 1B, a plane portion 23 for restricting the rotation of the optical device M1 around the optical axis is formed on the annular reinforcing member 22. This plane portion 23 physically restricts the rotation of the optical device M1 around the optical axis, and thereby, the angle between the polarization axis of the optical isolator 1 and the direction of polarization of incident light can be extremely easily controlled. That is to say, conventionally, the rotation adjustment is carried out during image recognition and output monitoring by using a mounting unit having a rotation adjusting mechanism around the optical axis at the time when the optical fiber is coupled to the optical isolator. In the present embodiment, the plane portion 23 on the annular reinforcing member 22 is formed so as to have a predetermined angle vis-à-vis the polarization axis of the optical isolator 1. Accordingly, when the direction of installment of the optical device M1 is physically restricted by the plane portion 23, the polarization axis of the optical isolator 1 can be adjusted so that the direction thereof agrees with the direction of polarization of incident light.

In the following, a manufacturing method for the optical device according to the present embodiment is described.

Figure 3:
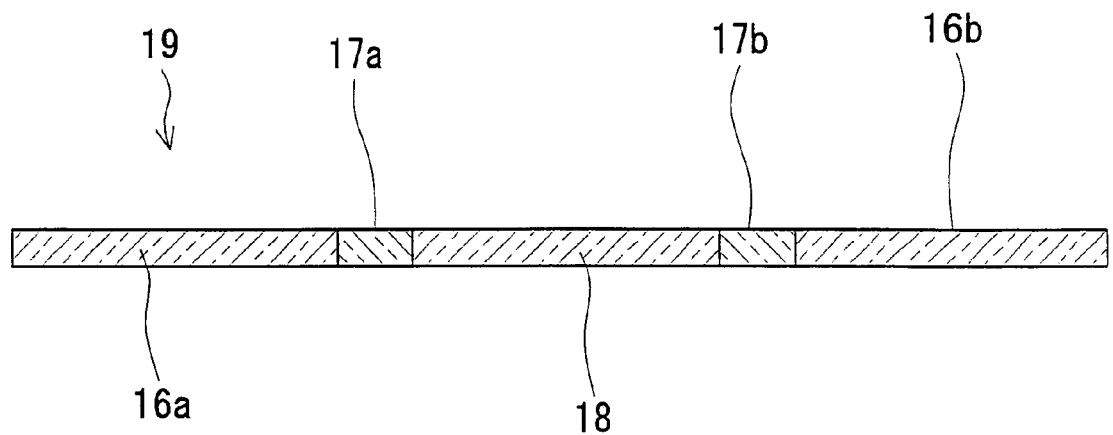
FIG. 3 is a cross-sectional diagram showing an optical fiber body.

First, as shown in FIG. 3, an optical fiber body 19 is fabricated. That is to say, one end of a first graded index optical fiber 17a (hereinafter also referred to as GI fiber) is fused to one end of a first single mode optical fiber 16a (hereinafter also referred to as SM fiber), and an end of a coreless optical fiber (hereinafter also referred to as CL fiber) 18 for adjusting the focal distance is fused to the other end of the above described first GI fiber 17a. Furthermore, one end of a second GI fiber 17b is fused to the other end of the above described CL fiber 4, and a second SM fiber 16b is fused to the other end of this second GI fiber 17b so as to gain the optical fiber body 19.

Here, SM fibers for light transmission of which the mode field diameters (hereinafter also referred to as MFD) are approximately 10 μm, for example, can be used for the first and second SM fibers. In addition, the GI fibers 17a and 17b have a structure with the same outer diameter as the SM fibers, where the index refraction gradually decreases from the central axis to the outer periphery. Most GI fibers have a distribution of approximately the index of refraction squared, with a lens effect, and therefore, an appropriate coupling optical system can be formed in the case where an appropriate length of a GI fiber having an appropriate distribution of the index of refraction is used. In addition, it is preferable for the CL fiber 18, which is for adjusting the focal distance, to have a structure with the same outer diameter as the SM fibers, and no core. The CL fiber may be replaced with an SM fiber having a large diameter.

The condition for collimate light in the case where a point light source is on an end surface of a GI fiber is that the length of the GI fiber be one quarter of the period (P=0.25 represented using the pitch (P) corresponding to the period of the light beam). However, the actual coupling efficiency becomes highest when the positions of beam waists of light that has been emitted from opposite end surfaces of the GI fiber agree with each other. The position of the beam waist at P=0.25 is located at the end surface for light emission of the GI fiber, and therefore, the positions of beam waists do not agree with each other when the optical element 5 is inserted between the first GI fiber 17a and the second GI fiber 17b. Accordingly, it is preferable for the beam waist to be formed at a point away from the end surface for light emission of the GI fiber, in order to enhance the coupling efficiency by making the positions of the beam waists agree with each other. That is to say, it is preferable for the length of the GI fiber to be greater than the length of one quarter of the period of the light beam (P>0.25). In addition, it is preferable for the lengths of the first and second CL fibers 16a and 16b to be adjusted in a manner where the beam spots created by the first and second GI fibers 17a and 17b agree with each other at the center.

Figure 4:
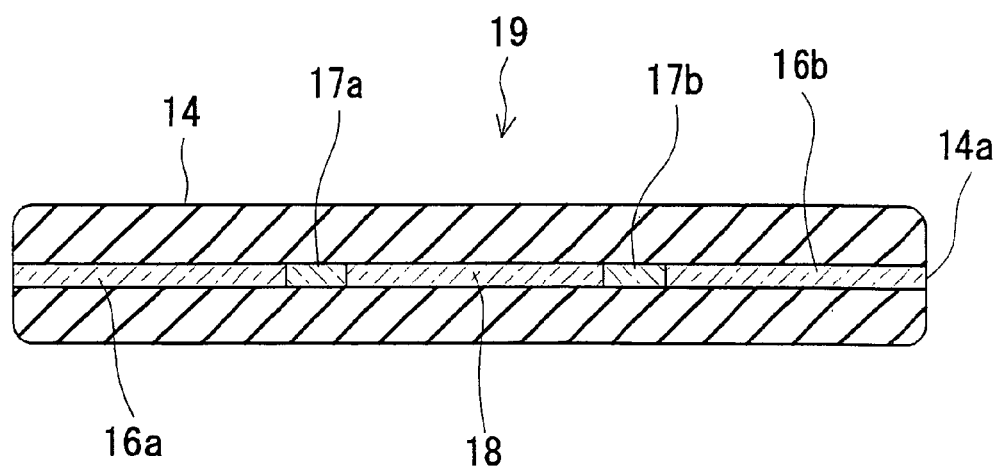
FIG. 4 is a cross-sectional diagram showing an optical fiber which is coated with a ferrule.

Next, as shown in FIG. 4, the inside of a through hole that has been formed in the ferrule 14 is filled with an adhesive, and after that, the optical fiber body 19 is inserted, and then, the adhesive is thermo-set for fixation. The ferrule 14 is made of, for example, zirconia. A thermosetting epoxy-based adhesive or the like can be used for the adhesive. Then, the two end surfaces of the ferrule 14 are polished.

Figure 5A:
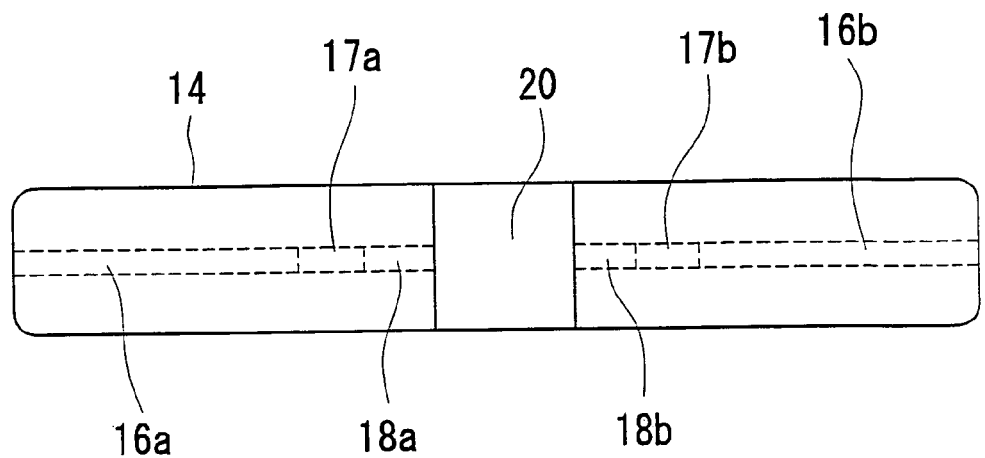
FIGS. 5A and 5B are a top diagram and a cross-sectional diagram showing a form of the optical device according to Embodiment 1 during the manufacturing process.
Figure 5B:
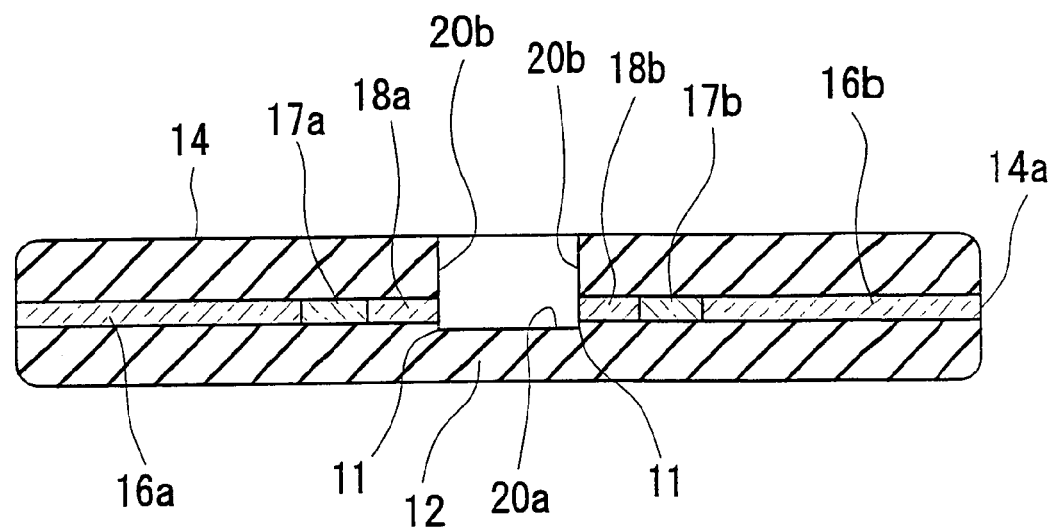

After that, as shown in FIGS. 5A and 5B, a portion of the CL fiber 18 in the optical fiber body 19 is cut out together with the ferrule 14, so that the CL fiber 18 is divided into a first CL fiber 18a and a second CL fiber 18b. At the same time as this, a recess 20 is created for a slit pedestal, in order to mount an optical element. The recess 20 can be created by, for example, carrying out dicing in the direction of the diameter of the ferrule 14, in a manner where a portion of the ferrule 14 remains. The recess 20 resulting from the dicing is in slit form. Here, the optical fiber body 19 is a single optical fiber, and therefore, in the case where this is inserted into the ferrule 14 so as to be fixed, and after that, a portion of the CL fiber 18 is cut out, as shown in FIG. 1A, the axis of the two optical fibers can be prevented from shifting. Accordingly, it is possible to increase the coupling efficiency, as compared with the case where the first and second SM fibers 2a and 2b are simply placed in such a manner as to face each other.

Figure 6A:
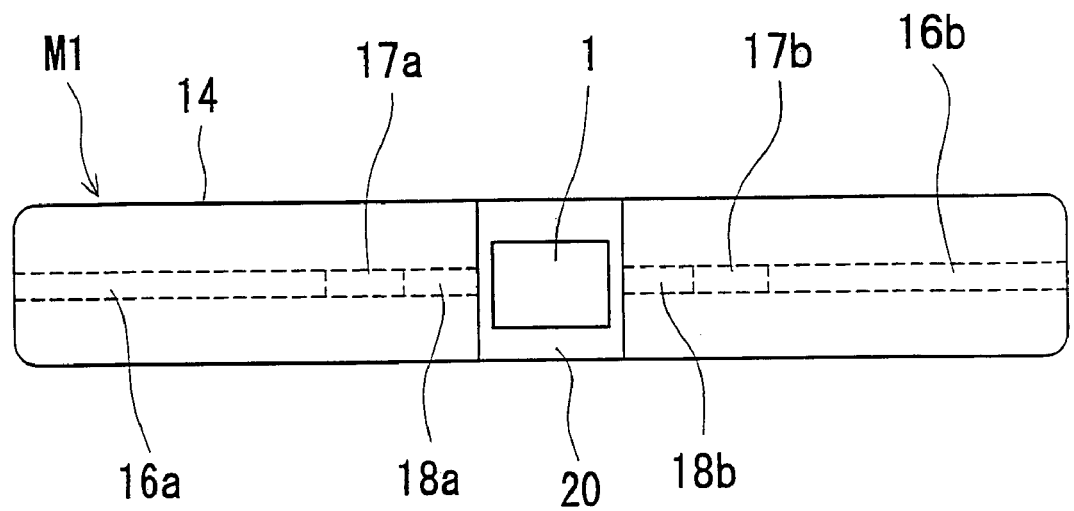
FIGS. 6A and 6B are a top diagram and a cross-sectional diagram showing another form of the optical device according to Embodiment 1 during the manufacturing process.
Figure 6B:
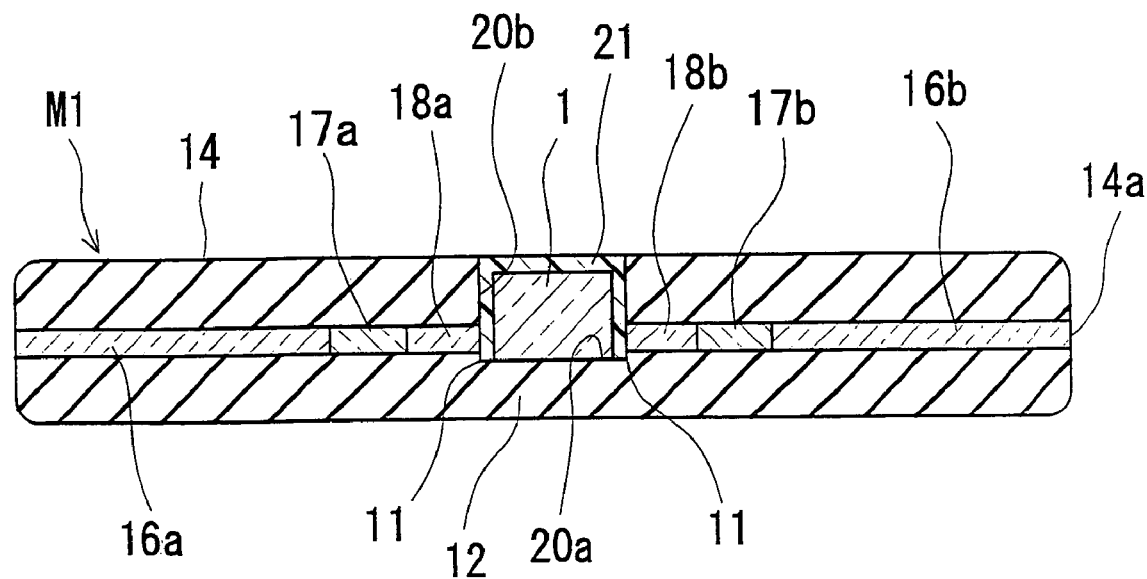

Next, as shown in FIGS. 6A and 6B, the optical isolator 1 is fixed within the recess 20, and the space around the optical isolator 1 is filled in with an adhesive 21. For the adhesion of the optical isolator 1, an acryl-based adhesive which is both UV curing and thermosetting can be used. In addition, an epoxy-based low TG (TG<−50 degrees C.) UV curing adhesive can be used to fill in the space around the optical isolator 1. Here, the optical isolator 1 is installed so that the direction of the polarization axis of the optical isolator 1 forms a predetermined angle with the bottom surface 20a of the recess. The polarization axis of the polarizer on the entrance side of the optical isolator 1, for example, is parallel or inclined by 45° vis-à-vis the bottom surface 20a of the recess.

Here, in the present embodiment, the bottom surface 20a of the recess is flat, and the corner 11 where the bottom surface 20a and the side 20b of the recess intersect is not substantially rounded, and is in edge form. In the case where the recess 20 is in such a form, a problem can be prevented where the optical element 1 is lifted by a rounded portion of the corner 11 in a manner where it inclines and deviates from the optical path.

Figure 9A:
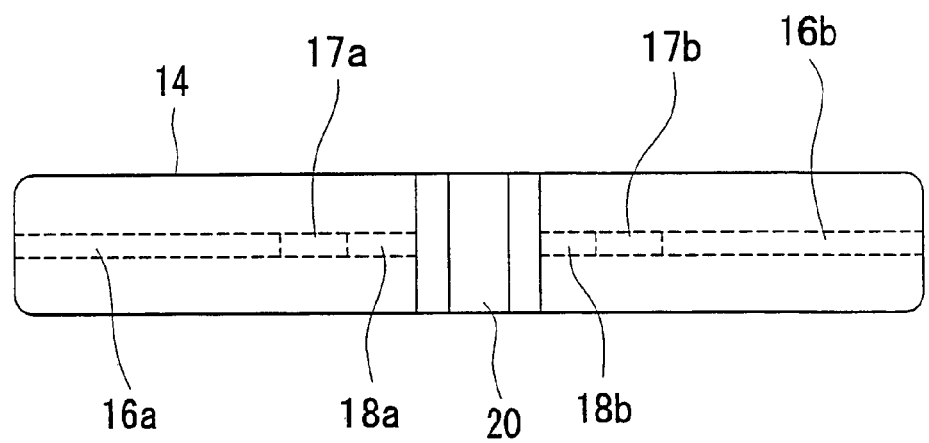
FIGS. 9A and 9B are a top diagram and a cross-sectional diagram showing a modification of the optical device in FIGS. 5A and 5B.
Figure 9B:
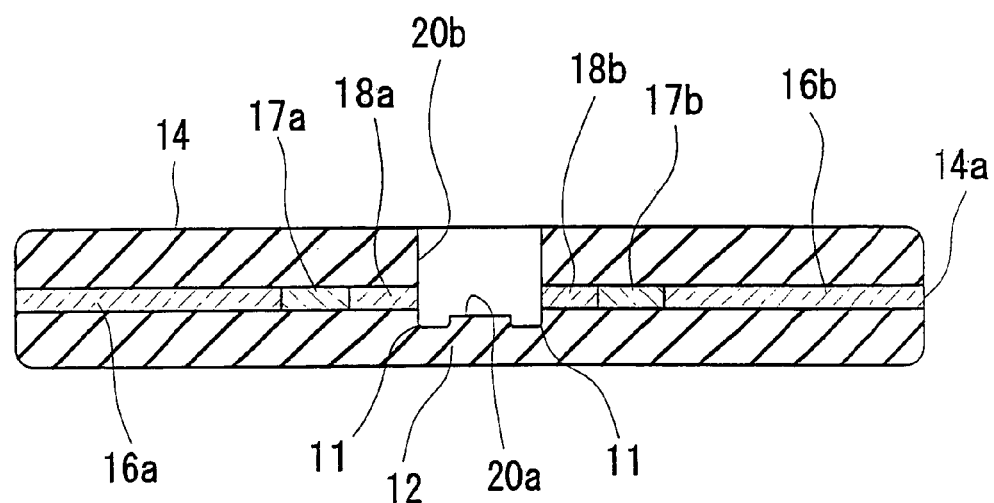
Figure 10A:
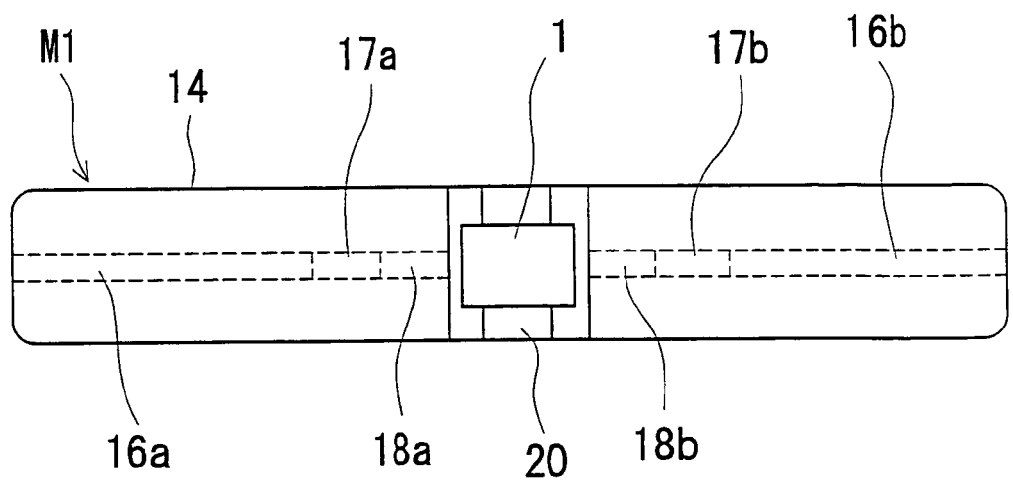
FIGS. 10A and 10B are a top diagram and a cross-sectional diagram showing a modification of the optical device in FIGS. 6A and 6B.
Figure 10B:
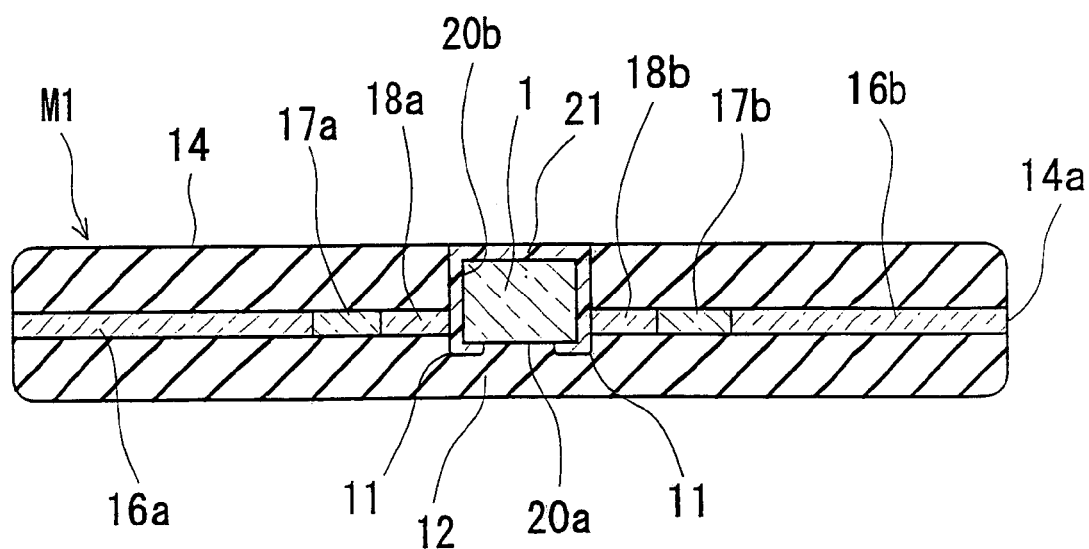

Here, in some cases, the strength of the ferrule is reduced by the corner 11 which becomes the origin of cracking when the corner 11 where the bottom surface 20a and the side 20b of the recess intersect is not substantially rounded and is in edge form. Therefore, as shown in FIGS. 9A and 9B, the only portions of the bottom surface 20a of the recess in the vicinity of the sides on the first CL fiber 18a side and on the second CL fiber 18b side are dug deeper, and the corner 11 may be rounded. In such a configuration, as shown in FIGS. 10A and 10B, the optical element 1 can be prevented from being lifted by the rounded corners of the bottom of the recess, and a possible origin for cracking can be eliminated due to the rounded portion of the corner 11, thus enhancing the strength of the ferrule 14.

Figure 7A:
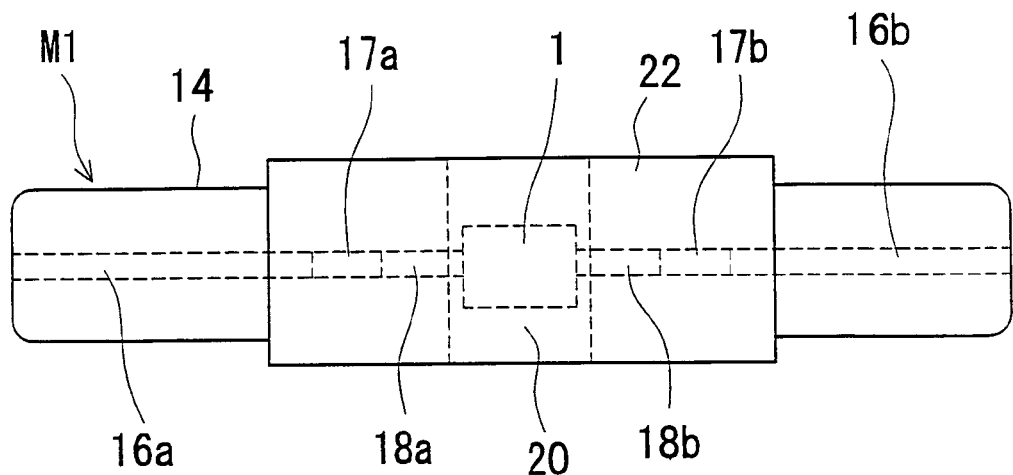
FIGS. 7A and 7B are a top diagram and a cross-sectional diagram showing another form of the optical device according to Embodiment 1 during the manufacturing process.
Figure 7B:
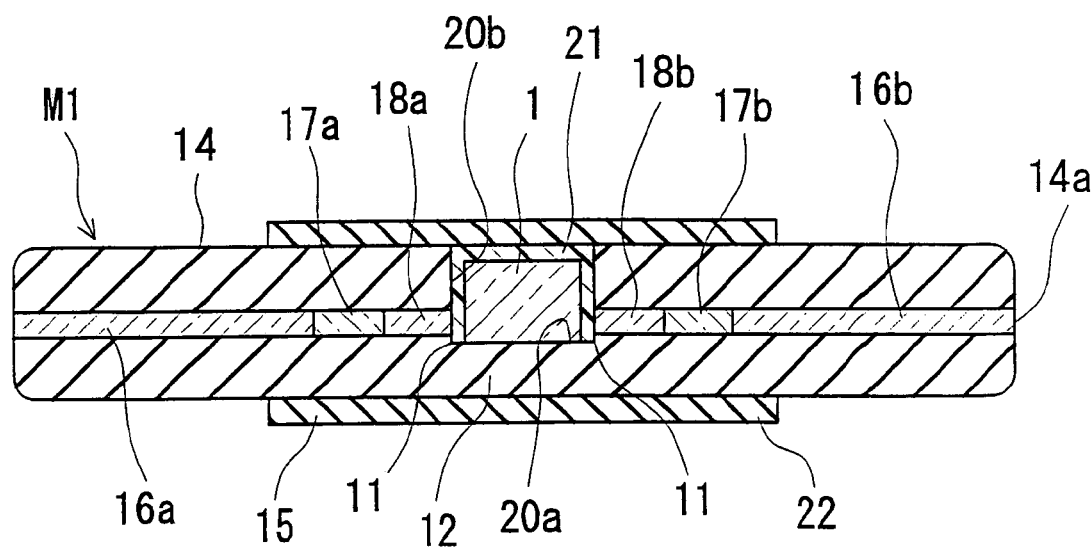

Next, as shown in FIGS. 7A and 7B, the optical device M1 can be gained by covering the portion of the recess 20 of the ferrule 14 with an annular protective member 22 made of zirconia or the like, which is then fixed. It is preferable for the annular protective member to be a cylinder having a thickness of 0.1 mm or greater, and to be made of the same material as the ferrule 14. In addition, the annular protective member 22 can be fixed to the ferrule 14 by means of insertion through the application of pressure, or by means of adhesion. Here, the adhesive that is utilized at the time of fixture of the optical fiber body 19 and the protective member 22 is not limited to a thermosetting type adhesive, but rather, fixture using low melt point glass or a solder can be used without causing any problems.

The plane portion 23 for position restriction has been formed in advance in the annular protective member 22, as shown in FIG. 1B. This plane portion 23 is fixed so as to be parallel, for example, to the bottom surface of the recess 20. In the case where the polarization axis of the optical isolator 1 is set so as to form a predetermined angle with the bottom surface of the recess 20, for example, made parallel to the bottom surface of the recess 20, the direction of the polarization axis of the optical isolator within the optical device M1 can be determined without fail by physically positioning the optical isolator with the plane portion 23 and the part for attachment to the outside.

Here, a module (not shown) provided with a ferrule 14 is connected to the entrance side of such an optical device M1, and an optical connector (not shown) is connected to the exit side, and thereby, a module on which no optical isolator is mounted can be easily converted to a module on which an optical isolator is mounted. In addition, the graded index fibers 17A and 17B are used for the optical fiber body 19, and therefore, the module can be utilized by being coupled to an optical element 1 that is as thick as approximately 0.8 mm, for example, with low loss even when such an optical element has been inserted.

In the present embodiment, an example where the plane portion 23 is formed along the entire length of the protective member 22 so as to be parallel to the bottom surface 20a of the recess is described. However, the plane portion 23 formed on the protective member 22 is not limited to this, but rather, can be in various forms. FIGS. 11A to 14A and FIGS. 11B to 14B are cross-sectional diagrams and side diagrams showing the variation in the forms of the plane portion 23. In the following examples, the portion made of the recess 20, the optical isolator 1 and the adhesive 21 is the same, and is represented as an optical isolator portion 26.

Figure 11A:
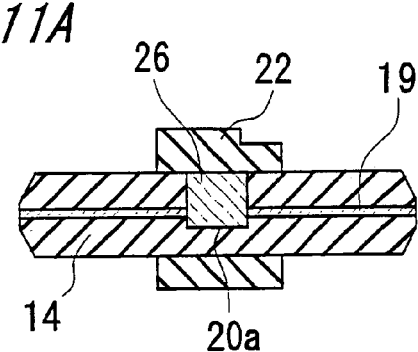
FIGS. 11A and 11B are a cross-sectional diagram and a side diagram showing a modification of the optical device in FIGS. 1A and 1B.
Figure 11B:
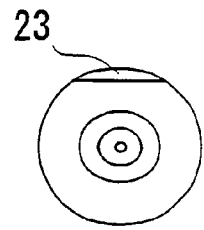

In the example shown in FIGS. 11A and 11B, the plane portion 23 is formed along a portion of the entire length of the protective member 22. That is to say, the plane portion 23 is formed by cutting out a portion of the protective member 22 in columnar form from the outer peripheral surface. In this example, the plane portion 23 is also formed so as to be parallel to the bottom surface 20a of the recess. In this example, the time and effort for processing can be reduced to a great degree in comparison with the example of FIGS. 1A and 1B, where the plane portion 23 is formed along the entire length of the protective member 22.

Figure 12A:
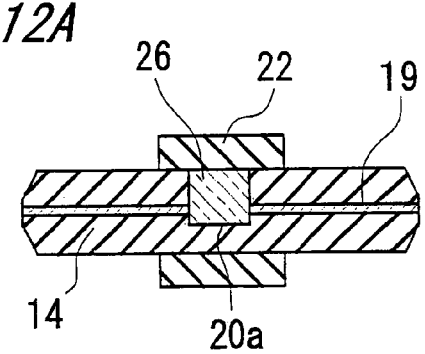
FIGS. 12A and 12B are a cross-sectional diagram and a side diagram showing another modification of the optical device in FIGS. 1A and 1B.
Figure 12B:
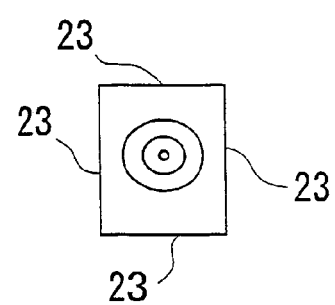

In the example of FIGS. 12A and 12B, the protective member 22 is formed in prism form so as to have four plane portions 23. The protective member 22 is formed in a manner where one of the four planes is parallel to the bottom surface 20a of the recess. This example is suitable in the case where other parts to be mounted on the outside of the optical module M1 are formed of planes and lines, for example, in the case where the optical module M1 is placed on a plane.

Figure 13A:
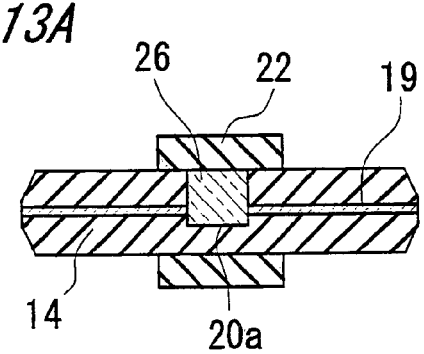
FIGS. 13A and 13B are a cross-sectional diagram and a side diagram showing another modification of the optical device in FIGS. 1A and 1B.
Figure 13B:
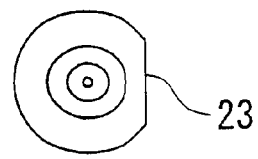

In the example shown in FIGS. 13A and 13B, the plane portion 23 is provided in the direction perpendicular to the bottom surface 20a of the recess.

Figure 14A:
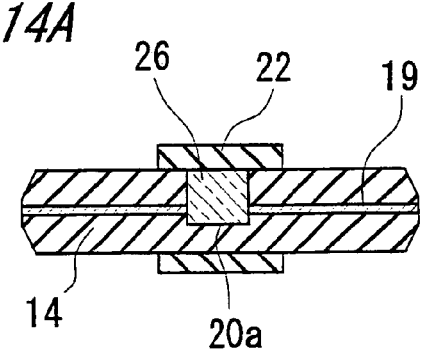
FIGS. 14A and 14B are a cross-sectional diagram and a side diagram showing another modification of the optical device in FIGS. 1A and 1B.
Figure 14B:
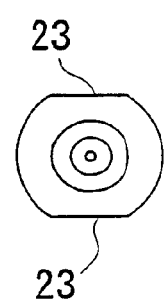

In the example shown in FIGS. 14A and 14B, two plane portions 23 are formed so as to be parallel to the bottom surface 20a of the recess. In the case where the plane portions 23 are provided in two places, on the top and on the bottom, in such a manner, higher restriction around the optical axis can be achieved.

Embodiment 2

FIGS. 15A to 19A and FIGS. 15B to 19B are cross-sectional diagrams and side diagrams showing the optical device according to Embodiment 2. In the present embodiment, a protrusion portion for restricting the rotation of the optical device around the optical axis is formed in the annular reinforcing member. The remaining portions are the same as those in Embodiment 1. In the present embodiment also, the rotation of the optical device M1 around the optical axis can be physically restricted by the above described protrusion portion 24, and thereby, the angle between the polarization axis of the optical isolator 1 and the direction of polarization of incident light can be extremely easily controlled.

Figure 15A:
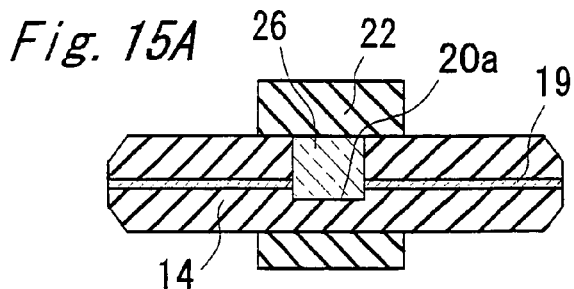
FIGS. 15A and 15B are a cross-sectional diagram and a side diagram showing the optical device according to Embodiment 2 of the present invention.
Figure 15B:
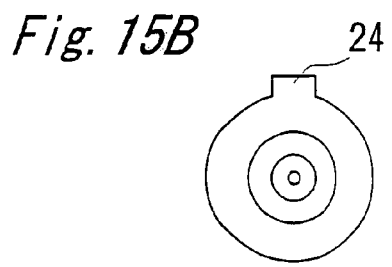

FIGS. 15A and 15B show an example where a protrusion portion 24 of which the cross-section is in rectangular form is provided to the protective member 22. The protrusion portion 24 is formed so as to have a predetermined relationship with the polarization axis of the optical element 1 installed within the recess 20. In FIGS. 15A and 15B, for example, the central axis of the protrusion portion is positioned within the plane which includes the optical axis (the central axis of the optical fiber) of the optical device M1, and which is perpendicular to the bottom surface 20a of the recess.

Figure 16A:
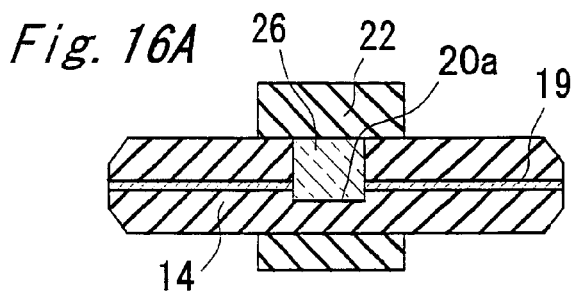
FIGS. 16A and 16B are a cross-sectional diagram and a side diagram showing a modification of the optical device in FIGS. 15A and 15B.
Figure 16B:
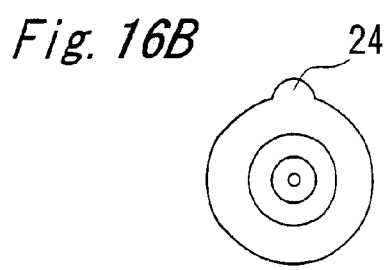

In addition, in the example of FIGS. 16A and 16B, the protrusion portion 24 of which the cross-section is half-circular is formed in the protective member. In the case where the cross-section is half-circular, an effect is gained where it becomes difficult for the protrusion portion 24 to be chipped at the time when the protrusion portion 24 is engaged with a trench or the like for position restriction.

Figure 17A:
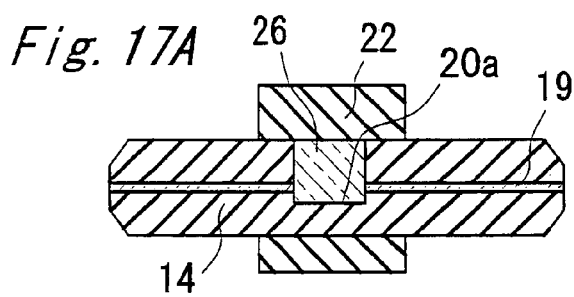
FIGS. 17A and 17B are a cross-sectional diagram and a side diagram showing another modification of the optical device in FIGS. 15A and 15B.
Figure 17B:
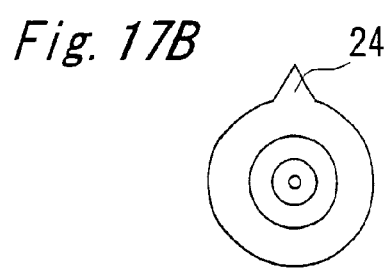

In the example of FIGS. 17A and 17B, the protrusion portion 24 formed in the protective member has a cross-section in triangular form. In this case also, it is preferable for the trench that will be engaged with the protrusion portion 24 to have a cross-section in triangular form. In the case where the cross-section of the protrusion portion 24 is triangular, the inclined sides of the trench that receives the protrusion portion 24 work as a guide leading the protrusion portion 24 to an appropriate position, even when the position of the protrusion portion 24 slightly shifts from the trench for position restriction in the direction of rotation around the optical axis. Accordingly, positioning of the optical device becomes easy.

Figure 18A:
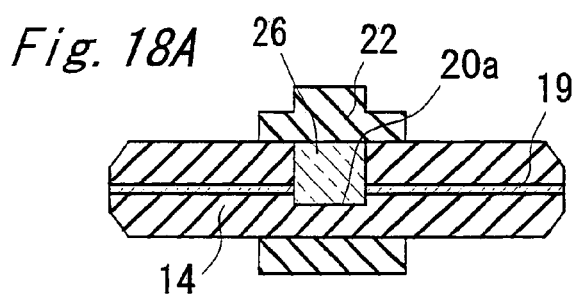
FIGS. 18A and 18B are a cross-sectional diagram and a side diagram showing another modification of the optical device in FIGS. 15A and 15B.
Figure 18B:
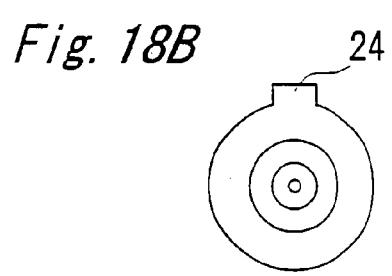

In the example of FIGS. 18A and 18B, the protrusion portion 24, which is shorter than the entire length of the protective member 22, is formed instead of the protrusion portion 24 along the entire length of the protective member 22. As a result of this, it also becomes easy to restrict the position of the optical device in the direction parallel to the optical axis.

Figure 19A:
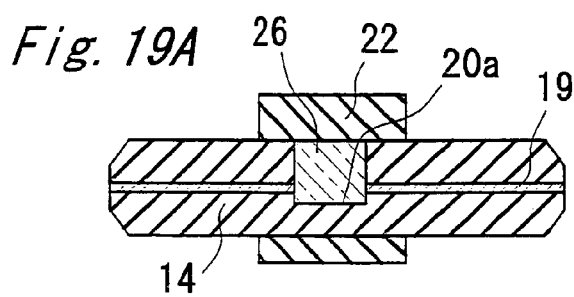
FIGS. 19A and 19B are a cross-sectional diagram and a side diagram showing another modification of the optical device in FIGS. 15A and 15B.
Figure 19B:
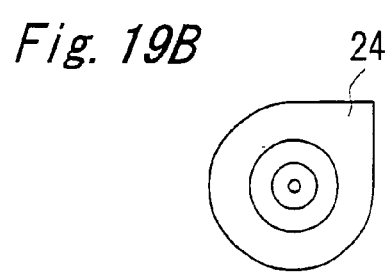

In the example of FIGS. 19A and 19B, the protrusion portion 24 formed in the protective member has a cross-section in triangular form, and at the same time, the central axis thereof includes the optical axis (the central axis of the optical fiber) of the optical device M1, and is positioned in the plane that crosses the bottom surface 20a of the recess at 45°. This is appropriate, for example, in the case where the polarization axis of the optical element is inclined by 45° relative to the bottom surface 20a of the pedestal.

Here, the form of the protrusion portion 24 provided to the protective member and the place where the protrusion portion 24 is formed are not limited to those cited in the above. As long as the position of the optical device in the rotational direction can be physically restricted, a variety of forms are possible, provided that they are in accordance with the object to which the optical device is fixed or the parts which are connected to the optical device.

Embodiment 3

FIGS. 20A to 23A and FIGS. 20B to 23B are cross-sectional diagrams and side diagrams showing the optical device according to Embodiment 3. In the present embodiment, a trench portion 25 for restricting the rotation of the optical device around the optical axis is created in the annular reinforcing member. The remaining portions are the same as those in Embodiment 1. In the present embodiment also, the rotation of the optical device M1 around the optical axis is physically restricted by this trench portion 25, and thereby, the angle between the polarization axis of the optical isolator 1 and the direction of polarization of incident light can be extremely easily controlled.

Figure 20A:
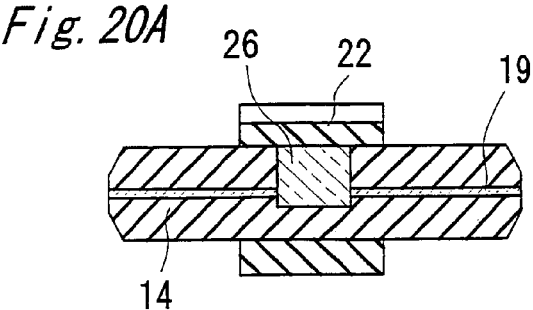
FIGS. 20A and 20B are a cross-sectional diagram and a side diagram showing the optical device according to Embodiment 3 of the present invention.
Figure 20B:
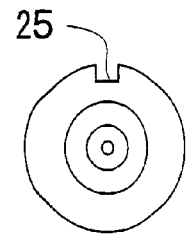

FIGS. 20A and 20B show an example where the trench 25 of which the cross-section is in rectangular form is created in the protective member 22, from the external peripheral surface. Trench 25 is created along the entire length of the protective member 22. The trench 25 is created so as to have a predetermined relationship with the polarization axis of the optical element 1 that is installed within the recess 20. In FIGS. 20A and 20B, for example, the central axis of the trench portion is positioned within the plane which includes the optical axis (the central axis of the optical fiber) of the optical device M1, and which is perpendicular to the bottom surface 20a of the recess.

Figure 21A:
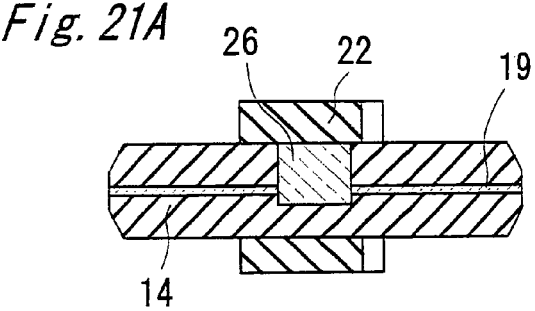
FIGS. 21A and 21B are a cross-sectional diagram and a side diagram showing a modification of the optical device in FIGS. 20A and 20B.
Figure 21B:
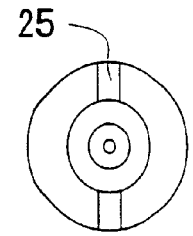

In the example of FIGS. 21A and 21B, the trench 25 is created in one end of the protective member 22. The trench is created in a manner where the longitudinal direction of the trench 25 is perpendicular to the bottom surface 20a of the recess. In addition, in this example, the trench 25 is created along the entire diameter of the ferrule 25, of which the cross-section is circular. Consequently, the trench 25 is created in two places, above and below the ferrule 19. As a result of this, higher restriction of the position in the rotational direction can be achieved.

Figure 22A:
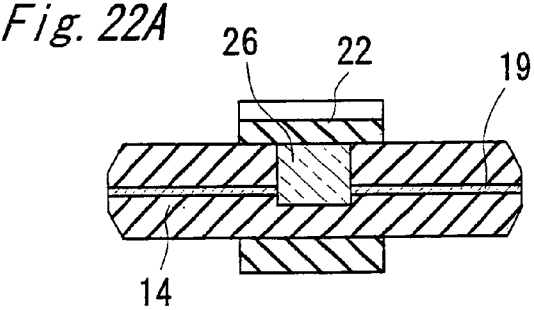
FIGS. 22A and 22B are a cross-sectional diagram and a side diagram showing another modification of the optical device in FIGS. 20A and 20B.
Figure 22B:
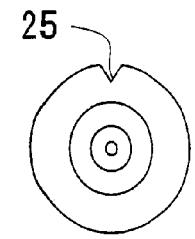

In the example of FIGS. 22A and 22B, the trench 25 of which the cross-section is in triangular form is created in the protective member 22, from the external peripheral surface. The cross-section of the trench 25 is made triangular, and thereby, the same effects as those described in the example of FIGS. 17A and 17B can be gained.

Figure 23A:
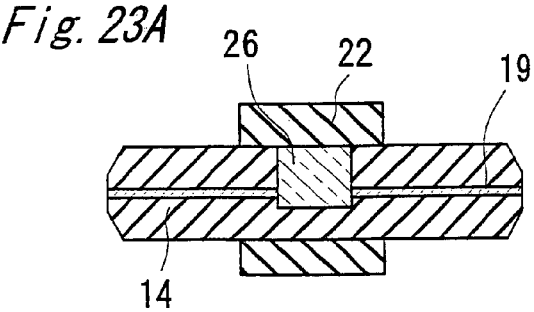
FIGS. 23A and 23B are a cross-sectional diagram and a side diagram showing another modification of the optical device in FIGS. 20A and 20B.
Figure 23B:
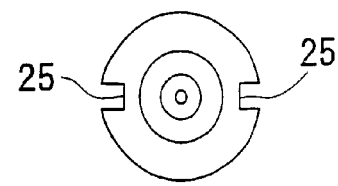

In the example of FIGS. 23A and 23B, two trenches, each of which is the same as that of FIGS. 20A and 20B, are provided, in a manner where they are on opposite sides of the optical ferrule. Here, as long as the position of the optical device in the rotational direction can be physically restricted, a variety of forms of the trench(es) 25 provided to the protective member are possible, provided that they are in accordance with the object to which the optical device is fixed and the parts which are connected to the optical device.

Embodiment 4

In reference to FIGS. 24A and 24B, 25A and 25B, as well as 26A and 26B, respectively, the examples where the manner of formation of the optical isolator portion has been modified in the optical devices of FIGS. 1A and 1B, 15A and 15B, as well as 20A and 20B are described.

Figure 24A:
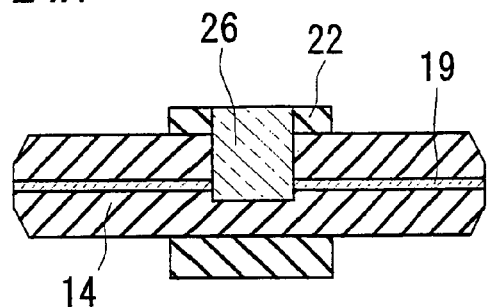
FIGS. 24A and 24B are a cross-sectional diagram and a side diagram showing the optical device according to Embodiment 4 of the present invention.
Figure 24B:
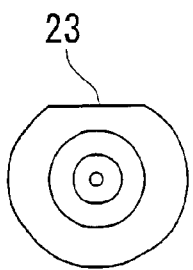

In the following, an example of the manufacturing procedure of the example shown in FIGS. 24A and 24B is described.

First, the optical fiber body 19 is fixed in the hole of the ferrule 14 by means of adhesion, and the two end surfaces of the ferrule 14 are polished. Here, a thermosetting epoxy-based adhesive can be used for the adhesion. After that, a sleeve made of zirconia or the like is made to cover the ferrule 14 as the protective member 22, and is fixed by means of a thermosetting epoxy adhesive or the like. Then, a recess is created by dicing the protective member 22 and the ferrule 14 together. In addition, the plane portion 23 is simultaneously formed in the dicing process. Specifically, the plane portion 23 is formed by repeating dicing while changing the depth of the dicing. Furthermore, in the same manner as described in Embodiment 1, the optical element portion 26 is formed by filling the recess with an adhesive after an optical device, such as an optical isolator, has been placed in the recess.

When the protective member 22 is made to cover the optical element after it has been installed in the recess 20, the protective member 22 shifts in the vicinity of the optical element in a scraping manner, and therefore, there is a possibility that the protective member 22 will involve the adhesive layer of the optical element portion 26. In addition, the strength of the ferrule is reduced before the protective member 22 has covered it, and therefore, the ferrule may be broken under the load that is applied at the time when the protective member 22 covers it. In the present embodiment, the protective member 22 has been attached to the ferrule before the formation of the optical element portion 26, and therefore, the above described problems can be prevented.

In the optical device that has been gained in the above described manner, a through hole that continues to the recess is created in the protective member 22. It is preferable for the adhesive layer of the optical element portion 26 to fill this through hole. In such a case, a reduction in the strength against bending of the optical device can be avoided.

Figure 25A:
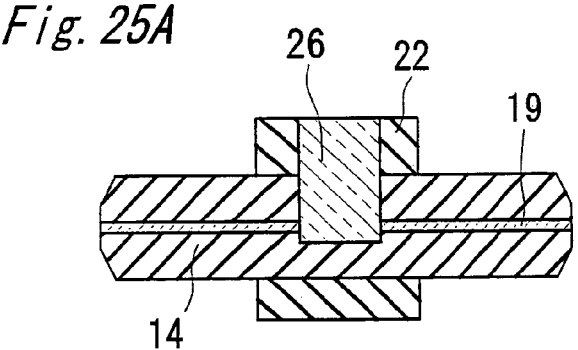
FIGS. 25A and 25B are a cross-sectional diagram and a side diagram showing a modification of the optical device in FIGS. 24A and 24B.
Figure 25B:
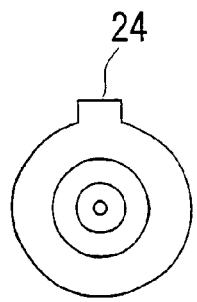
Figure 26A:
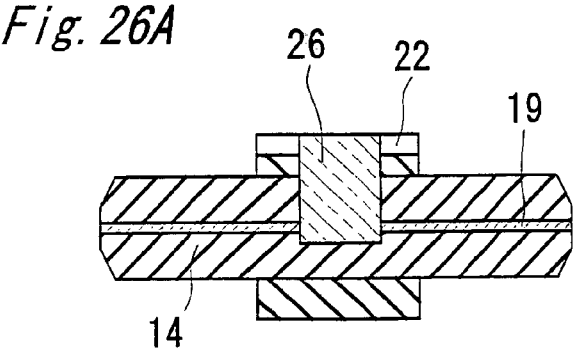
FIGS. 26A and 26B are a cross-sectional diagram and a side diagram showing another modification of the optical device in FIGS. 24A and 24B.
Figure 26B:
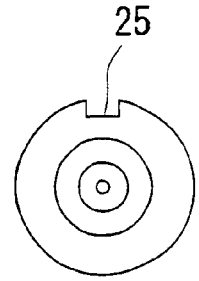
Figure 27A:
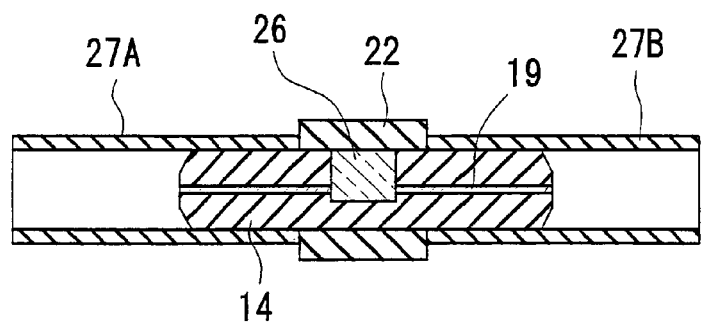
FIGS. 27A and 27B are a cross-sectional diagram and a side diagram showing the optical device according to Embodiment 5 of the present invention.
Figure 27B:
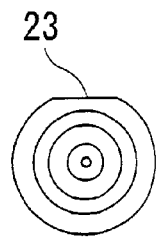
Figure 28A:
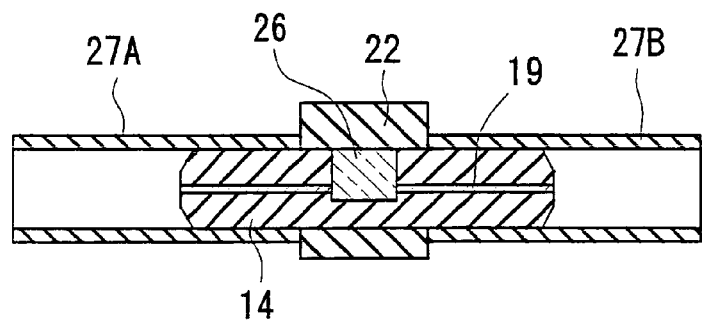
FIGS. 28A and 28B are a cross-sectional diagram and a side diagram showing a modification of the optical device in FIGS. 27A and 27B.
Figure 28B:
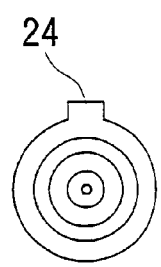
Figure 29A:
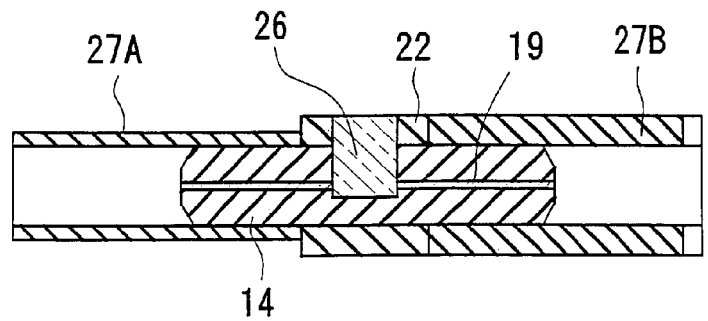
FIGS. 29A and 29B are a cross-sectional diagram and a side diagram showing another modification of the optical device in FIGS. 27A and 27B.
Figure 29B:
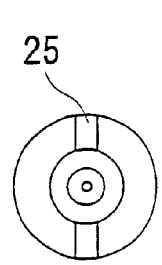

Here, the optical device can also be manufactured according to the same method as that described above, in the form having the protrusion portion 24 shown in FIGS. 25A and 25B, and in the form having the trench portion 25 shown in FIGS. 26A and 26B. In this case, it is preferable for the protrusion 24 or the trench 25 to have been created in the protective member 22 before this is attached to the ferrule. Though it is possible to apply the structure and the manufacturing method of the present embodiment irrespectively of the form of the means for position restriction, in the case where the means for position restriction made of the plane portion 23 shown in FIGS. 24a and 24B is provided, this plane portion 23 can be simultaneously formed with the dicing for the creation of the recess, and the time and effort for manufacturing can be greatly reduced.

Embodiment 5

FIGS. 27A to 29A and 27B to 29B are cross-sectional diagrams and side diagrams showing the optical device according to Embodiment 5. In the present embodiment, sleeves 27A and 27B for connection to another ferrule are attached to the ferrule 19 in the examples shown in FIGS. 1A and 1B, 15A and 15B, as well as 21A and 21B. Here, the manufacturing method described in Embodiment 4 is further applied to the example shown in FIGS. 29A and 29B.

Embodiment 6

Figure 30A:
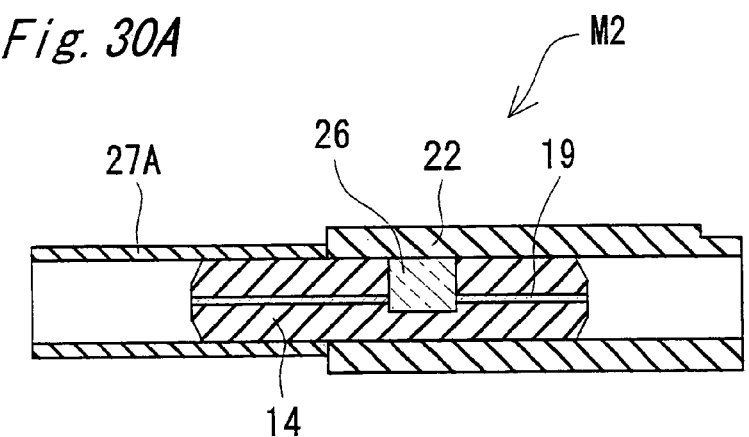
FIGS. 30A and 30B are a cross-sectional diagram and a side diagram showing the optical device according to Embodiment 6 of the present invention.
Figure 30B:
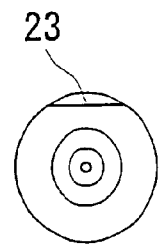
Figure 31A:
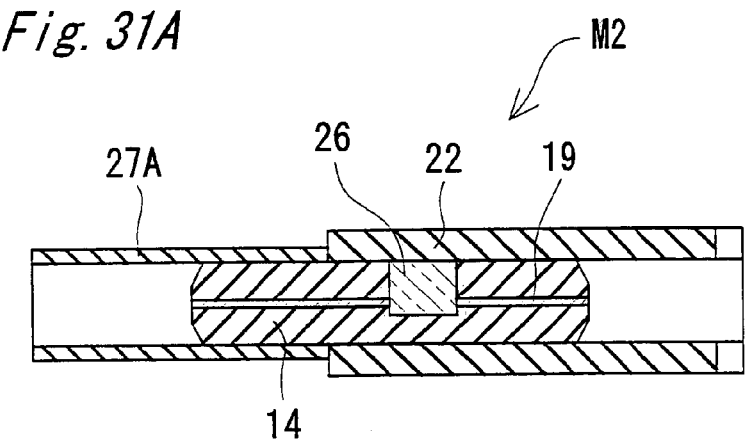
FIGS. 31A and 31B are a cross-sectional diagram and a side diagram showing a modification of the optical device in FIGS. 30A and 30B.
Figure 31B:
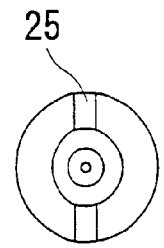

FIGS. 30A and 30B, as well as 31A and 31B, show examples where the protective member 22 works as a sleeve for connection to another ferrule. In the present embodiment, the protective member 22 is also used as the sleeve for connection to a ferrule, and is additionally used as the means for position restriction that physically regulates the rotation around the optical axis, and therefore, the number of members and the number of steps for manufacture are both reduced. Here, FIGS. 30A and 30B show an example where the plane portion 23 is provided on the external peripheral surface of the protective member 22 as the means for position regulation, and FIGS. 31A and 31B show an example where the trench 25 is created in one end of the protective member 22. In these examples, though the protective member 22 is used as one of the sleeves that cover the two sides of the ferrule, the protective member 22 may be used as the two sleeves on the right and the left.

The optical device shown in FIGS. 30A and 30B can be manufactured, for example, as follows. First, the optical fiber body 19 is fixed in the hole in the ferrule 14 by means of adhesion, and the two end surfaces of the ferrule 14 are polished. After that, the optical fiber body 19 is divided, together with the ferrule 14, by means of dicing, and in addition, an optical isolator is mounted in the same manner as in Embodiment 1, so as to form the optical isolator portion 26. In addition, a portion of the outer periphery of the protective member 22 which is used for connection to another ferrule and serves as protection is processed through polishing so as to form the plane portion 23, which is a restriction means for physically regulating the rotation around the optical axis. Then, the protective member 22 is made to cover the ferrule 14 and is fixed by means of a thermosetting epoxy adhesive or the like, and the ferrule 14 is covered with the sleeve 27A so that the optical device M1 can be gained.

Embodiment 7

Figure 32A:
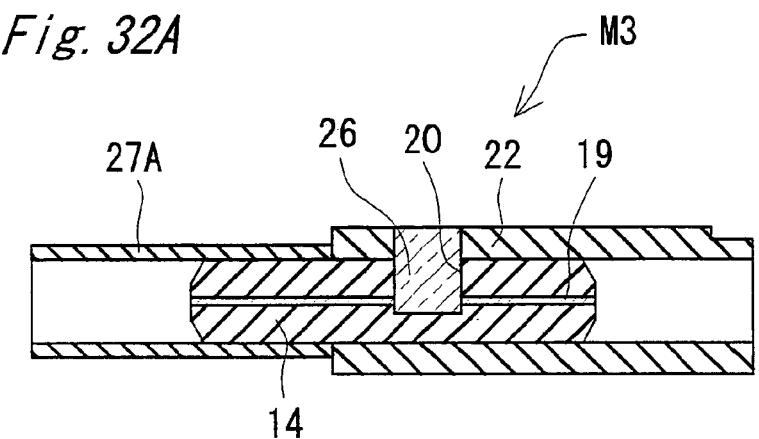
FIGS. 32A and 32B are a cross-sectional diagram and a side diagram showing the optical device according to Embodiment 7 of the present invention.
Figure 32B:
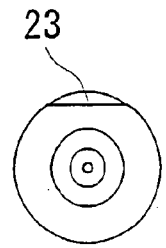
Figure 33A:
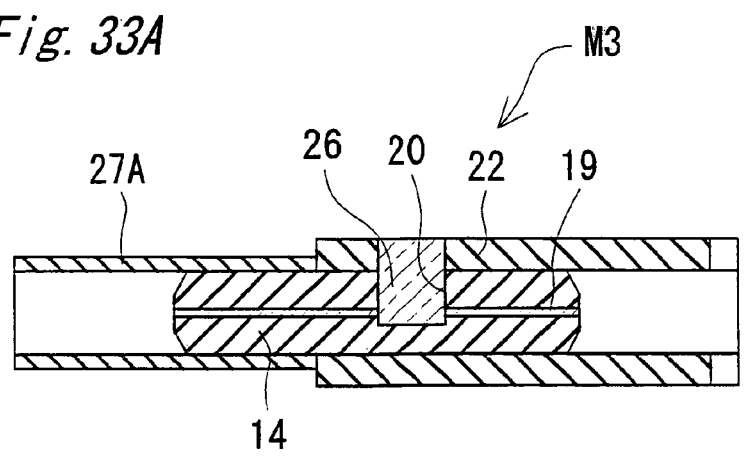
FIGS. 33A and 33B are a cross-sectional diagram and a side diagram showing a modification of the optical device in FIGS. 32A and 32B.
Figure 33B:
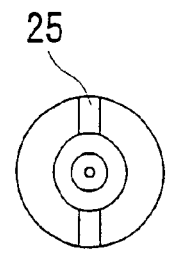

In reference to FIGS. 32A and 32B, as well as FIGS. 33A and 33B, examples where the method for formation of the optical isolator portion has been changed in the optical device of Embodiment 6 are described. The manufacturing procedure of the example of the optical device of FIGS. 32A and 32B is described below.

First, the optical fiber body 19 is fixed in the hole of the ferrule 14 by means of adhesion, and the two end surfaces of the ferrule 14 are polished. The protective member 22 made of zirconia or the like which is used as a sleeve for connection to another ferrule and which serves as a protective member is inserted into the ferrule 14 through the application of pressure. Then, a dicing process is carried out on the protective member 22 and the ferrule 14 at the same time, and a recess is created. In addition, the plane portion 23 is simultaneously formed by means of the dicing process as the restriction means for physically regulating the rotation around the optical axis. Then, an optical isolator is mounted in the same manner as in Embodiment 1, so as to gain the optical isolator portion 26. Finally, the ferrule 14 is covered with the sleeve 27 from the side opposite to the side which is covered with the protective member 22, so as to gain the optical device M3.

According to the manufacturing method of the present embodiment, involvement of the adhesive layer of the optical element portion and cracking of the ferrule can be prevented at the time of attachment of the protective member, so that the yield of the manufacturing process can be increased. In addition, particularly in the form shown in FIGS. 32A and 32B, the plane portion 23, which is the means for position restriction, can be formed simultaneously with the recess 20 that contains the optical element, by means of dicing for creating the recess 20, and therefore, the number of members and the number of steps for manufacturing can both be reduced, making this form preferable.

In addition, it is preferable to fill the through hole that has been created in the protective member 22 with an adhesive in the same manner as in Embodiment 4.

Embodiment 8

Figure 36A:
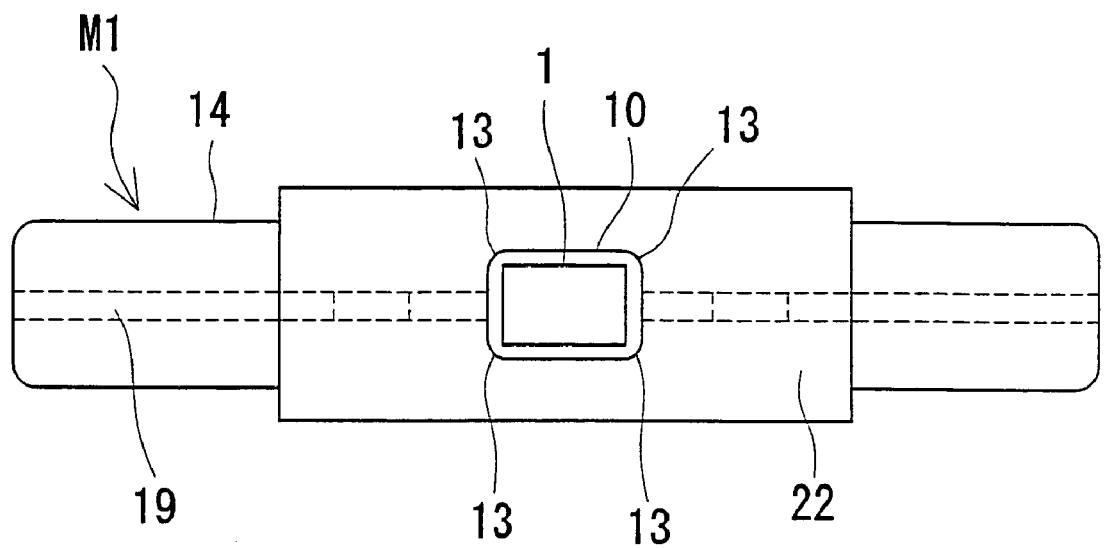
FIGS. 36A and 36B are a top diagram and a cross-sectional diagram showing the optical device according to Embodiment 8 of the present invention.
Figure 36B:
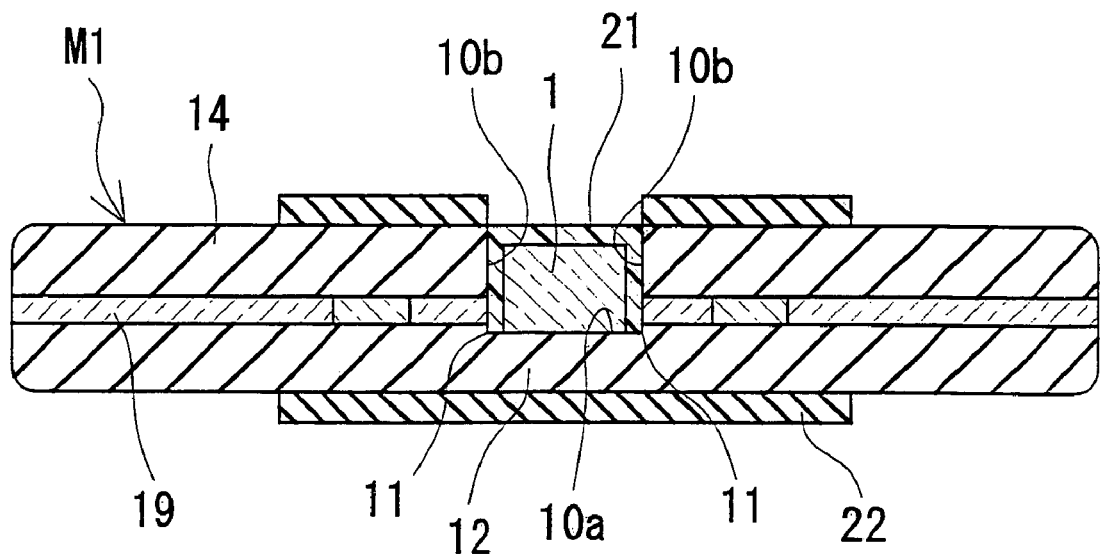

FIGS. 36A and 36B are a top diagram and a cross-sectional diagram showing the optical device according to Embodiment 8. As shown in FIGS. 36A and 36B, the recess in which an optical element is placed is created as a counterbored hole portion 10 in rectangular form or circular form as viewed as in the plan view, in the optical device according to the present embodiment. Then, the bottom surface of the counterbored hole portion 10 is flattened, and the corner where the bottom surface and the side of the counterbored hole portion intersect is made to have a curvature radius of 0.2 mm or less. Here, "the recess 10 is a counterbored hole portion" means that the width of the recess 10 in the direction perpendicular to the optical axis is smaller than the width of the ferrule 14 in the case where the recess 10 is viewed as in the plan view, and the thickness of the ferrule 14 in the direction perpendicular to the optical axis remains as a side wall of the recess. The extra thickness of the ferrule 14 is great, in comparison with the recess in slit form that has been created by dicing the ferrule, and therefore, the strength of the optical device against bending becomes high.

In such a configuration, the position of the optical element can be prevented from shifting, while securing the strength of the ferrule. That is to say, in the case where, for example, the recess 20 is created by means of dicing, as shown in FIGS. 5A and 5B, and the corner 12 where the bottom surface and the side of the recess intersect is not substantially rounded and is in edge form, the ferrule 14 becomes easily broken, with an origin of cracking at the corner 20, though a positional shift caused by the optical element 1 being lifted by the rounded portion can be prevented. On the other hand, in the case where the corner 11 where the bottom surface and the side of the recess 20 intersect is intentionally rounded, and at the same time, a trench is provided along the sides that cross the sides of the recess, as shown in FIGS. 9A and 9B, the thickness of the ferrule locally becomes thin, reducing the strength of the ferrule, though the positional shift caused by the optical element 1 being lifted by the rounded portion can be prevented.

In contrast to this, the curvature radius of the corner where the bottom surface and the side of the recess 10 intersect is not greater than 0.2 mm in the present embodiment, and therefore, the optical element 1 is not lifted by the rounded portion of the corner, and the optical element 1 can be prevented from deviating from the light path. In addition, in the present embodiment, the recess 10 is in counterbored hole form, and thereby, the strength of the ferrule 14 against bending can be secured, due to the great amount of extra thickness of the ferrule, even in the case where the curvature radius of the corner where the bottom surface and the side intersect is not greater than 0.2 mm. Here, the material strength is conventionally proportional to the squared cross-sectional area, and therefore, the strength is enhanced in proportion to the squared cross-sectional area of the ferrule in the case where the cross-sectional area of the extra thickness 12 of the ferrule increases. Accordingly, it becomes possible to secure the strength of the ferrule 14, and to simultaneously secure the light path by appropriately positioning the optical element 1.

Here, in the present embodiment, it is preferable for the corner where the bottom surface and the side of the recess intersect to be slightly rounded, in order to further stably maintain its strength. Accordingly, it is preferable for the curvature radius of the corner where the bottom surface and side of the recess intersect to be not less than 0.01 mm.

In addition, it is preferable for the corners where the sides of the recess intersect to have no edge to become an origin for cracking. Accordingly, it is preferable for the recess 10 in counterbored hole form that is created in the ferrule 1 to be in rectangular form with the corners rounded or in circular form, as in the plan view. Here, in the case where the form of the recess 10 in the plan view is circular, it becomes difficult to mount the optical element 1, and therefore, the rectangular form with the corners rounded is more desirable in the case where manufacturing efficiency is taken into consideration.

It is preferable for the recess 10, which is a counterbored hole portion, to be formed by means of ultrasonic processing. It becomes possible, by means of ultrasonic processing, to desirably round the corners where the bottom surface and the sides of the recess intersect. In addition, the processed surface becomes smoother than in the case of a conventional dicing process.

Next, a manufacturing method for the optical device according to the present embodiment is described.

Figure 34A:
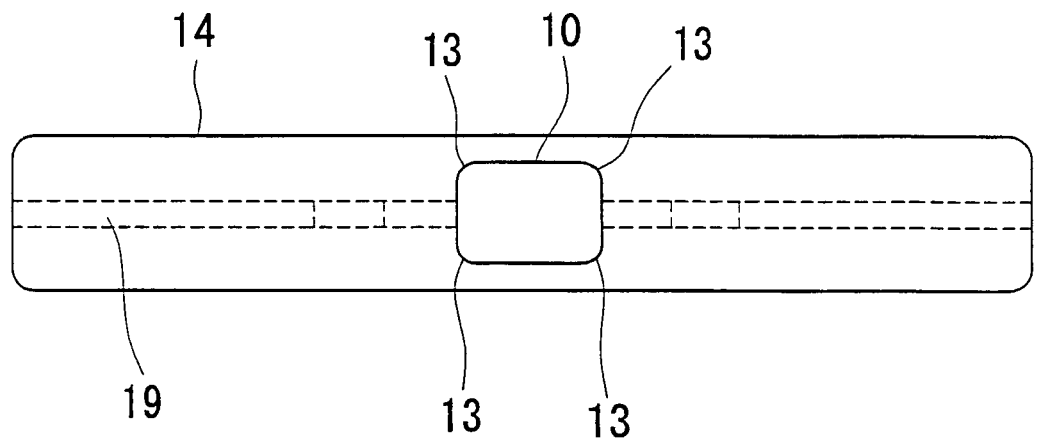
FIGS. 34A and 34B are a top diagram and a cross-sectional diagram showing a form of the optical device according to Embodiment 8 of the present invention during the manufacturing process.
Figure 34B:
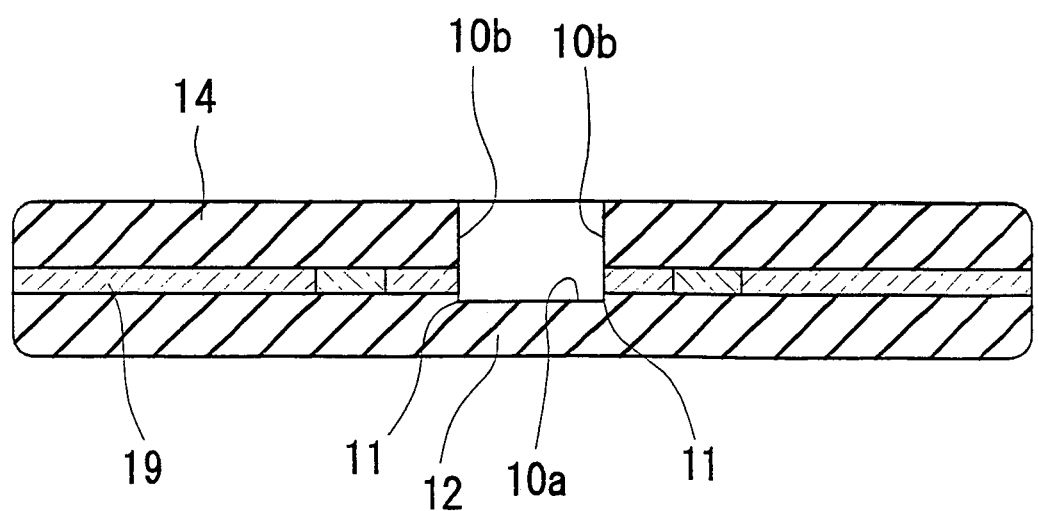

The same process as in Embodiment 1 is applied, up to the formation of the structure shown in FIG. 4. Next, as shown in FIGS. 34A and 34B, the counterbored hole 10 in rectangular form or in circular form is created from the outer periphery of the optical ferrule 14, in the direction where the CL fiber 18 that forms the optical fiber body 19 is divided, by means of ultrasonic processing.

In the present embodiment, it is preferable for the bottom surface 10a of the counterbored hole portion 10 to be created in a flat form. In addition, the depth of the counterbored hole portion 10 can be as deep as, for example, approximately 0.3 mm from the optical axis of the optical fiber body 19. In addition, the curvature radius of the corner 11 where the bottom surface 10 and the side 11 intersect is not greater than 0.2 mm. In addition, the width and the length of the counterbored hole portion 10 in the plan view are set to create the space where the optical element 1 can be placed. A square of which the sides are approximately 0.7 mm to 1.0 mm, or a circular form of which the diameter is approximately 0.7 mm to 1.0 mm, for example, are desirable.

Figure 35A:
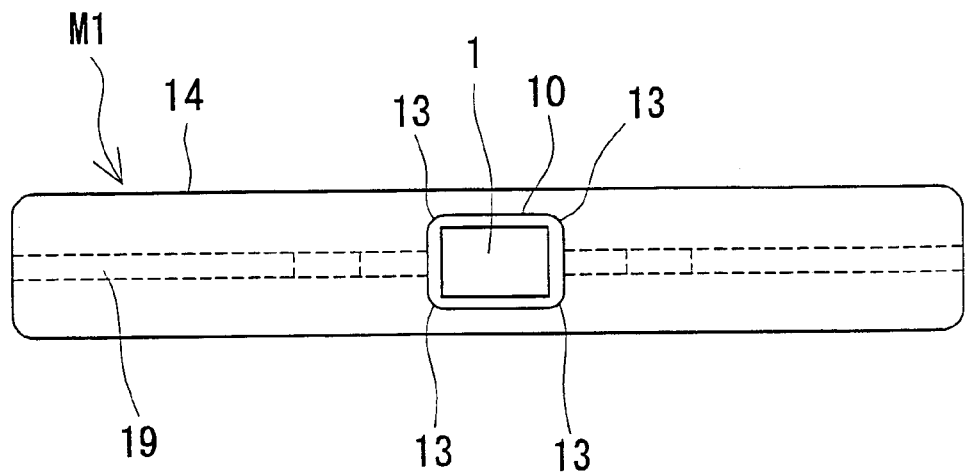
FIGS. 35A to 35C are top diagrams and a cross-sectional diagram showing another form of the optical device according to Embodiment 8 of the present invention during the manufacturing process.
Figure 35B:
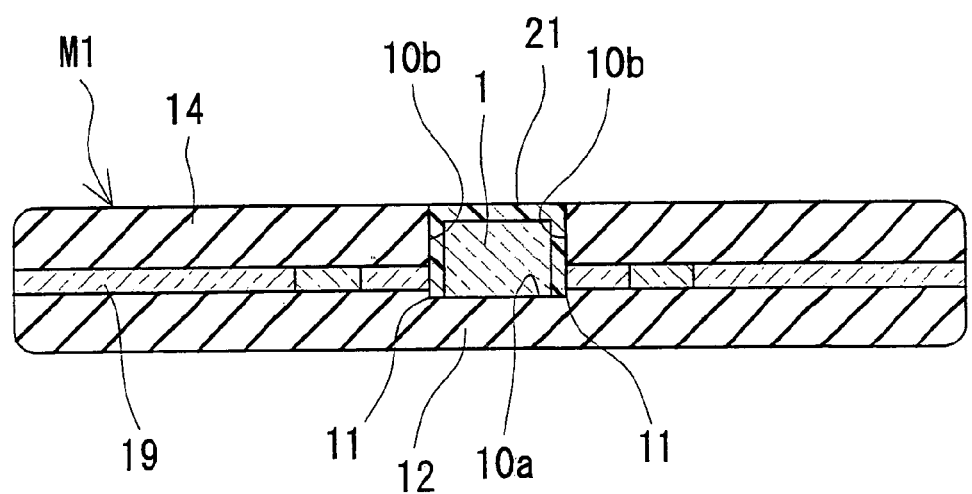
Figure 35C:
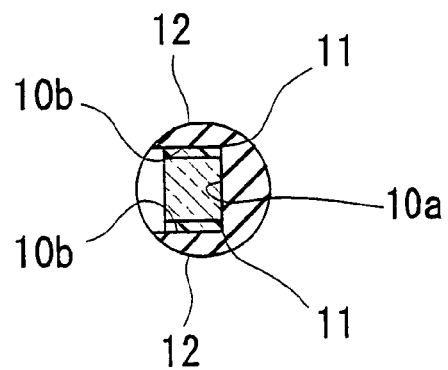

Next, as shown in FIGS. 35A and 35B, the optical element 1 is fixed by means of a light curing adhesive 21 after being mounted on the counterbored hole portion 10, and thus, the optical device M1 is manufactured.

Embodiment 9

Figure 37A:
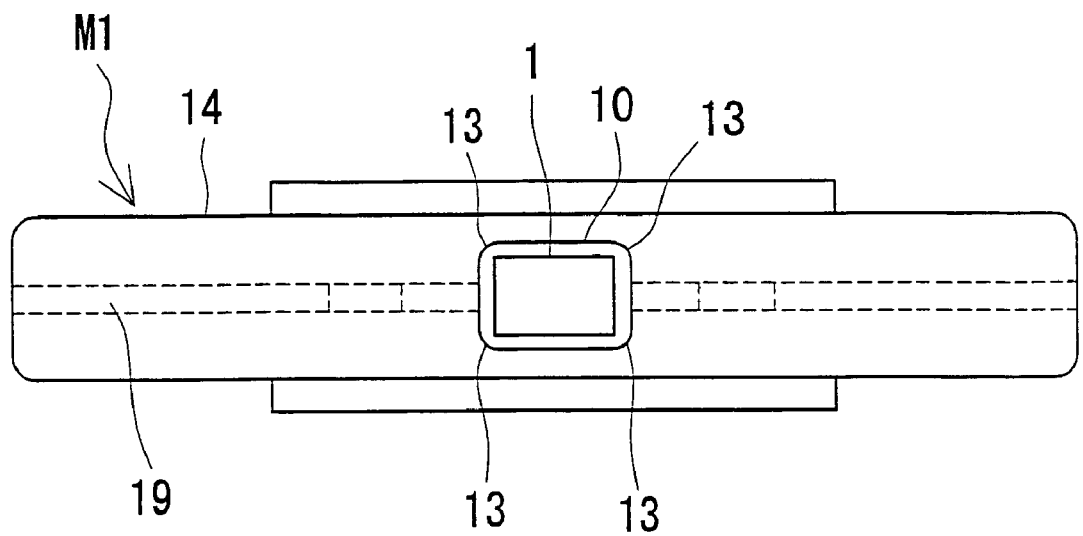
FIGS. 37A and 37B are a top diagram and a cross-sectional diagram showing the optical device according to Embodiment 9 of the present invention.
Figure 37B:
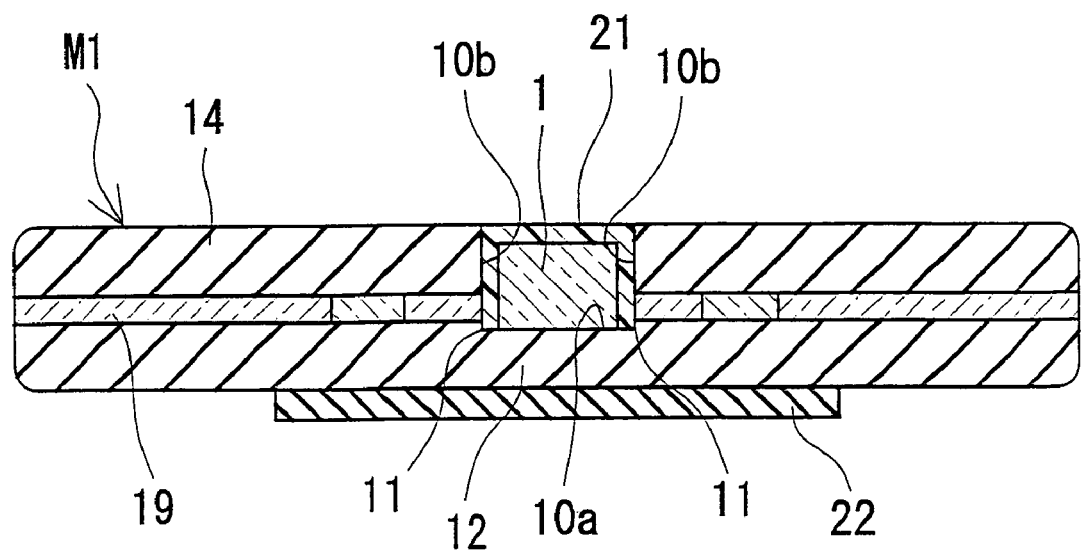

FIGS. 37A and 37B show an optical device according to Embodiment 9. In the present embodiment, a reinforcing member 22 in half-circular form is attached to the rear side of the counterbored hole portion 10 instead of the annular reinforcing member. The reinforcing member 22 may have any form, as long as at least the rear side of the counterbored hole portion 10 can be reinforced, and a half-circular form does not cause any problems.

In addition, it is preferable for the material of the protective member 22 for reinforcement to be the same material as that of the ferrule 14, irrespectively of whether the protective member is in annular form or in half-circular form. This is because in the case where the protective member 22 and the ferrule 14 are made of different materials, stress is applied to the ferrule 14, due to the difference in the coefficient of thermal expansion at the time when a thermal load is applied, causing a risk that the ferrule 14 will be cracked. The ferrule 14 may be made of a ceramic, or a metal or the like.

The optical device of the present embodiment can be appropriately applied to an optical communication apparatus, a sensor for optical measurement and the like. In addition, though a case where the optical element is an optical isolator is described as an example in the present embodiment, the optical element may be a wave filter or the like.

EXAMPLE 1

The optical device shown in FIG. 1A was manufactured as follows.

A single mode fiber 16A of which the mode field diameter is 10 μm, 0.8 mm of a graded index fiber 17A of which the core diameter is 105 μm and of which the difference in the index of refraction is 0.85%, 1.6 mm of a coreless fiber 18 made of pure quartz having no core, 0.8 mm of a graded index fiber 17B having the same parameters as those of the above described graded index fiber 17A, and a single mode fiber 16B were connected by means of fusing in this order, so as to form the optical fiber body 19.

After that, the above described optical fiber body 19 was fixed through adhesion in the hole of the ferrule 14, made of zirconia, of which the external diameter is 1.25 mm, and the two end surfaces of the ferrule 14 are polished. A thermosetting epoxy-based adhesive was used for adhesion.

After that, the portion of the coreless fiber 18 in the optical fiber body 19 was divided, together with the ferrule 14, by means of dicing, and a recess 20 was created so as to have a depth of approximately 0.78 mm.

Furthermore, the optical isolator 1 formed of a polarizer and a Faraday rotator, and of which the thickness is 0.8 mm, was made to adhere within the recess 20, by means of a UV curing and thermosetting acryl-based adhesive, where the space was filled in with an epoxy-based low TG (TG<−50 degrees) UV curing adhesive 21. Here, the lower side and the direction of polarization of incident light agree with each other in the above described optical isolator 1 of FIG. 2A, and accordingly, the direction of the bottom surface of the recess 20 and the direction of polarization of incident light also agree with each other.

Meanwhile, a polishing process was carried out on a portion of the external periphery of the protective member 22, which is a zirconia sleeve having an external diameter of 2.3 mm, an internal diameter of 1.25 mm, and a length of 2 mm, so as to form the plane portion 23. Furthermore, the above described protective member 22 was made to cover the portion of the recess 20 of the ferrule 14, and was fixed through adhesion by means of a thermosetting epoxy adhesive, so as to gain the optical device M1. Here, the protective member is fixed through adhesion, in a manner where the directions of the plan portion 23 and the bottom surface of the recess 20 agree with each other.

As for the optical properties of such an optical device M1, the loss that includes the connection loss of the two end surfaces with other ferrules 14 was 1.2 dB to 1.8 dB, and the isolation was 37 dB to 42 dB.

Table 1 shows the results of measurement of the strength against bending.

TABLE 1

| Sample number | Without protective member | With protective member, in the form of FIG. 1 |
|---|---|---|
| 1 | 4.4 | 30.5 |
| 2 | 4.5 | 25.2 |
| 3 | 4.6 | 29.3 |
| 4 | 4.5 | 23.3 |
| 5 | 4.6 | 29.1 |
| Average value | 4.5 | 27.5 |

Unit: N

The strength against bending has increased to 20 N or greater, in comparison with 4 N to 5 N in the case where there was no protective member 22. The strength against bending in the case where there was a protective member had an average value of approximately 27 N.

EXAMPLE 2

Ten optical devices (Sample A) which are the same as the optical device shown in FIGS. 9A and 9B, ten optical devices (Sample B) which are the same as the optical device shown in FIGS. 35A and 35B, and ten optical devices (Sample C) which are the same as the optical device shown in FIGS. 36A and 36B, were respectively manufactured, and the strength against bending of each ferrule was measured.

A ferrule of which the external diameter is 1.249 mm was utilized as the ferrule 1 to which the optical fiber body 19 was fixed by means of an epoxy-based thermosetting adhesive. In addition, the recess 20 in slit form was created by means of dicing processing in Sample A, so as to have a sufficient depth to divide the optical fiber body 19, and so as to have a sufficient depth to leave 0.45 mm of the thickness 12 of the ferrule 14. In addition, Sample A was manufactured so as to have a form where the width of the slit pedestal 20 is 0.8 mm. Meanwhile, optical devices where the recess 10 in square form of which the sides are 0.8 mm and of which the four corners have a curvature radius of 0.1 mm was created by means of ultrasonic processing, so as to have the same depth as that in the optical device shown in FIGS. 9A and 9B, were utilized as Samples B and C.

In addition, the optical element 1 (optical isolator) having a thickness of 0.6 mm was placed in the recesses 10 and 20, and was fixed by means of a transparent epoxy adhesive 21. Furthermore, an annular protective member, made of zirconia, of which the thickness is 0.1 mm was fixed through adhesion as the protective member 22.

Figure 38:
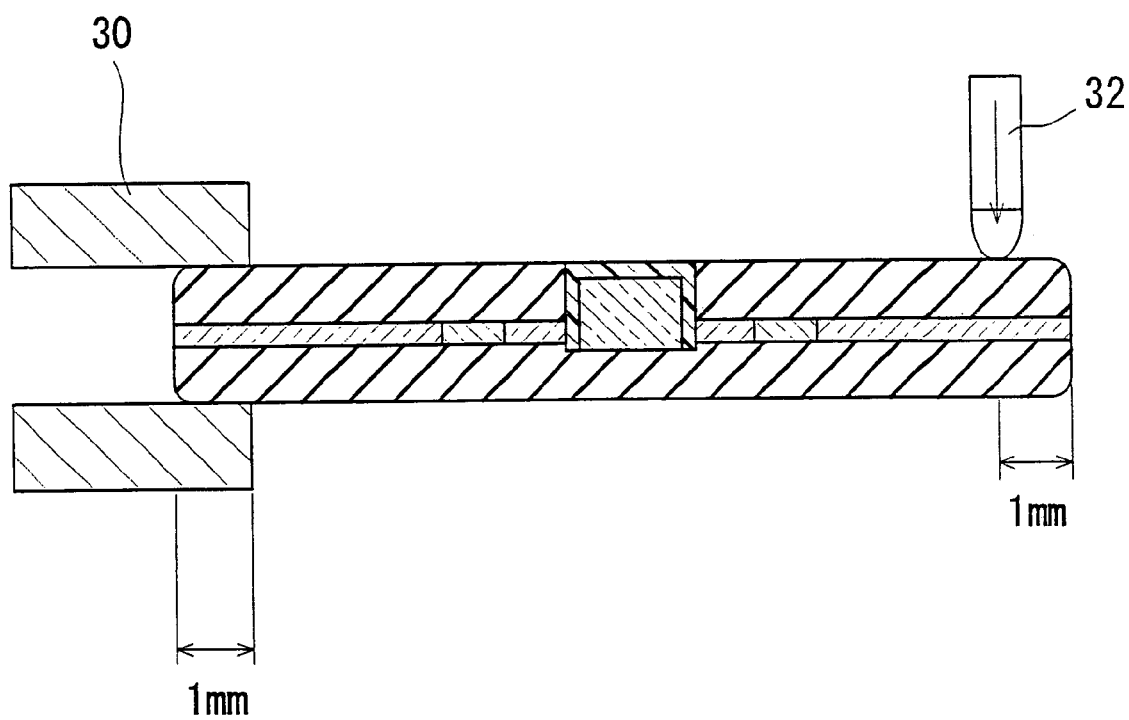
FIG. 38 is a schematic diagram showing a method for measuring the strength against bending.

In accordance with a method for manufacturing the strength against bending, as shown in FIG. 38, first, the range of 1 mm on one end of the optical device M1 was fixed to a vice 30, and a load was applied to a point 1 mm from the other end in the direction of the depth of the recess, by means of a push pull gauge 32. The load was increased by pressing down the push pull gauge 32 at a speed of 10 mm/minute in the direction of the depth, and the strength was measured when the ferrule broke.

The results of evaluation of the above described samples are shown in Table 2.

TABLE 2

Strength against bending of ferrule

|  | Sample A | Sample B | Sample C |
|---|---|---|---|
| no. 1 | 2.92 | 5.70 | 11.32 |
| no. 2 | 3.04 | 6.20 | 12.12 |
| no. 3 | 2.71 | 5.49 | 9.61 |
| no. 4 | 2.94 | 5.93 | 10.78 |
| no. 5 | 3.21 | 6.32 | 12.35 |
| no. 6 | 2.89 | 5.77 | 10.48 |
| no. 7 | 3.12 | 6.16 | 11.78 |
| no. 8 | 3.03 | 6.09 | 11.12 |
| no. 9 | 2.83 | 5.74 | 10.36 |
| no. 10 | 3.13 | 6.13 | 12.10 |
| Maximum | 3.21 | 6.32 | 12.35 |
| Minimum | 2.71 | 5.49 | 9.61 |
| Average | 2.98 | 5.95 | 11.20 |

As shown in Table 2, the maximum value of the strength against bending of the optical devices of Sample A where the recess is created in slit form was 3.21 (N), and the average value was 2.98 (N), while the maximum value of Sample B, where the recess was created in counterbored hole form, was 6.32 (N), the minimum value was 5.49 (N), and the average value was 5.95 (N). The results show that the minimum value of Sample B was greater than the maximum value of Sample A, and the average value of Sample B was almost two times greater than that of Sample A. In addition, Sample C, where the recess was in counterbored hole form, and to which the annular protective member was attached, had still a higher strength against bending, with a maximum value of 12.35 (N), a minimum value of 9.61 (N), and a average value of 11.20 (N).

As described above, it was confirmed that the strength against bending of the ferrule 14 significantly increased by making the recess be in counterbored hole form. In addition, it was confirmed that an even higher strength against bending could be gained by attaching the annular protective member 22.

Next, comparison of the strength against bending was carried out, with the case where the materials of the ferrule 14 and the annular protective member 22 were made different. That is to say, ten optical devices of Sample C, to which a protective member made of zirconia was attached, and ten optical devices in which the protective member made of zirconia is replaced with one made of stainless steel in the optical devices of Sample C were respectively manufactured, and the strength against bending was measured when heat was applied. The method for measurement was the same method as that described above and shown in FIG. 38, and measurement was carried out in an oven so that the temperature of the samples became +120° C.

The results of evaluation of the above described samples are shown in Table 3.

TABLE 3

Strength against bending of ferrule when heat is applied

| Material of annular member for reinforcement | Zirconia | Stainless steel |
|---|---|---|
| no. 1 | 10.98 | 8.89 |
| no. 2 | 11.88 | 9.74 |
| no. 3 | 10.78 | 9.49 |
| no. 4 | 11.98 | 9.59 |
| no. 5 | 9.95 | 8.16 |
| no. 6 | 10.06 | 8.75 |
| no. 7 | 11.54 | 9.47 |
| no. 8 | 11.01 | 8.92 |
| no. 9 | 11.13 | 9.80 |
| no. 10 | 9.52 | 8.18 |
| Maximum | 11.98 | 9.80 |
| Minimum | 9.52 | 8.16 |
| Average | 10.88 | 9.10 |

As shown in Table 3, in the case where the annular protective member 22 is made of zirconia in the same manner as the ferrule 14, the maximum value was 11.98 (N), and the average value was 10.88 (N), while in the case of stainless steel, the maximum value was 9.80 (N) and the average value was 9.10 (N), with a difference of 1.78 (N) in the average value. As described above, it was confirmed that it is possible to secure a higher strength against bending by making the annular protective member 22 and the ferrule 14 of the same material.

What is claimed is:

1. An optical device comprising: an optical fiber body; a ferrule which surrounds said optical fiber body and where a recess is provided so as to cross a coreless fiber within said optical fiber; and an optical element placed within the recess in said ferrule, wherein
   the optical device is provided with a protective member for protecting said recess, and the protective member has a restricting means for physically restricting rotation of the optical device around an optical axis.

2. The optical device according to claim 1, wherein said optical fiber body includes a single mode fiber, a graded index fiber of which the index of refraction gradually decreases from the central axis toward the outer periphery; and a coreless fiber having no core.

3. The optical device according to claim 1, wherein said restricting means is a plane portion provided in the protective member.

4. The optical device according to claim 1, wherein said restricting means is a protrusion portion provided in the protective member.

5. The optical device according to claim 1, wherein said restricting means is a trench portion provided in the protective member.

6. The optical device according to claim 1, wherein said restricting means sets the rotational angle between the direction of polarization of light that enters an optical isolator and the polarization axis of said optical isolator at an angle that is within 10 degrees.

7. The optical device according to claim 1, wherein said protective member has been integrally processed with said ferrule by means of dicing so that the recess is created.

8. The optical device according to claim 1, further comprising a sleeve that joins another ferrule from the outside to the ferrule to which said optical fiber body has been provided.

9. An optical device, comprising: an optical fiber body; a ferrule which surrounds said optical fiber body, and in which a recess has been provided so as to cross a coreless fiber within said optical fiber; and an optical element provided within the recess in said ferrule, wherein
a sleeve which protects said recess and which is connectable to another ferrule is provided, and the sleeve has a restriction means for physically restricting the rotation of the optical device around the optical axis.

10. The optical device according to claim 9, wherein said optical fiber body includes a single mode fiber, a graded index fiber of which the index of refraction gradually decreases from the central axis to the outer periphery, and a coreless fiber having no core.

11. The optical device according to claim 9, wherein said restriction means is a plane portion provided in said sleeve.

12. The optical device according to claim 9, wherein said restriction means is a protrusion portion provided in said sleeve.

13. The optical device according to claim 9, wherein said restriction means is a trench portion provided in said sleeve.

14. The optical device according to claim 9, wherein the rotational angle between the direction of polarization of light that enters the optical isolator and the polarization axis of said optical isolator is set at an angle that is within 10 degrees.

15. The optical device according to claim 9, wherein said sleeve has a form where the sleeve has been integrally processed with said ferrule by means of dicing so that the recess is created.

16. An optical device where a recess is created in an optical ferrule into which an optical fiber has been inserted in order to provide an optical element along the optical axis of said optical fiber, wherein
said recess is a counterbored hole having a flat bottom surface, in which the corner where the bottom surface and the side of said recess intersect has a curvature radius of not greater than 0.2 mm.

17. The optical device according to claim 16, wherein a member for reinforcement that covers at least the rear side of said recess is provided on the outer periphery of said optical ferrule.

18. The optical device according to claim 16, wherein the material of said member for reinforcement is the same as that of said optical ferrule.

* * * * *